(12) United States Patent
Hwang et al.

(10) Patent No.: US 12,720,495 B2
(45) Date of Patent: Aug. 25, 2026

(54) METHOD AND DEVICE FOR TRANSMITTING AND RECEIVING RADIO SIGNALS IN WIRELESS COMMUNICATION SYSTEM

(71) Applicant: LG ELECTRONICS INC., Seoul (KR)

(72) Inventors: Seunggye Hwang, Seoul (KR); Youngdae Lee, Seoul (KR); Jaehyung Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 18/705,769

(22) PCT Filed: Oct. 25, 2022

(86) PCT No.: PCT/KR2022/016366
§ 371 (c)(1),
(2) Date: Apr. 29, 2024

(87) PCT Pub. No.: WO2023/080521
PCT Pub. Date: May 11, 2023

(65) Prior Publication Data

US 2026/0143468 A1 May 21, 2026

(30) Foreign Application Priority Data

Nov. 5, 2021 (KR) ........................ 10-2021-0151084
Nov. 5, 2021 (KR) ........................ 10-2021-0151096

(51) Int. Cl.
*H04W 68/02* (2009.01)

(52) U.S. Cl.
CPC .................................. *H04W 68/02* (2013.01)

(58) Field of Classification Search
CPC .................................................... H04W 68/02
See application file for complete search history.

(56) References Cited

U.S. PATENT DOCUMENTS

2022/0330205 A1* 10/2022 Babaei .................. H04W 68/02
2023/0362889 A1* 11/2023 Xu .................... H04W 52/0219
2024/0080802 A1* 3/2024 Wu ....................... H04L 5/0094

FOREIGN PATENT DOCUMENTS

CN 113163476 7/2021
WO 2020-216242 10/2020
(Continued)

OTHER PUBLICATIONS

European Patent Office Application Serial No. 22890256.5, Search Report dated Oct. 1, 2025, 8 pages.
(Continued)

*Primary Examiner* — Kabir A Timory
(74) *Attorney, Agent, or Firm* — LEE, HONG, DEGERMAN, KANG & WAIMEY

(57) ABSTRACT

A terminal according to an embodiment disclosed herein can determine the position of a paging early indication-monitoring occasion (PEI-MO) and perform monitoring of the PEI on the basis that the terminal itself is a second type of terminal supporting a smaller maximum bandwidth than a first type of terminal, and that setting information of the paging early indication (PEI) includes first setting information common to the first type of terminal and the second type of terminal.

15 Claims, 15 Drawing Sheets

(56) References Cited

FOREIGN PATENT DOCUMENTS

| | | |
|---|---|---|
| WO | 2021-175032 | 9/2021 |
| WO | 2021-180206 | 9/2021 |

OTHER PUBLICATIONS

PCT International Application No. PCT/KR2022/016366, Written Opinion and International Search Report dated Feb. 17, 2023, 7 pages.

Huawei et al., "Paging enhancements for UE power saving in idle/inactive mode," R1-2108744, 3GPP TSG RAN WG1 Meeting #106bis, e-Meeting, Oct. 2021, 14 pages.

Moderator (Samsung), "Final Summary for TRS/CSI-RS occasion(s) for idle/inactive UEs," R1-2108515, 3GPP TSG RAN WG1 #106-e, e-Meeting, Sep. 2021, 119 pages.

* cited by examiner

FIG. 11 time
PO (R)
FD104
Add offset
FD103
PEI offset
PEI (R)
FD102
PO (R)
FD104
Add offset
PO (N)
FD103
PEI offset
PEI (N,R)
FD101

Cap - R
Cap - N
UE group #2
UE group #3
UE group #0
UE group #1
Subgroup for UE group # 2
Subgroup for UE group # 3
Subgroup for UE group # 0
Subgroup for UE group # 1
Bit index
#0
#1
#2
#3
#4
#5
#6
#7

FIG. 15

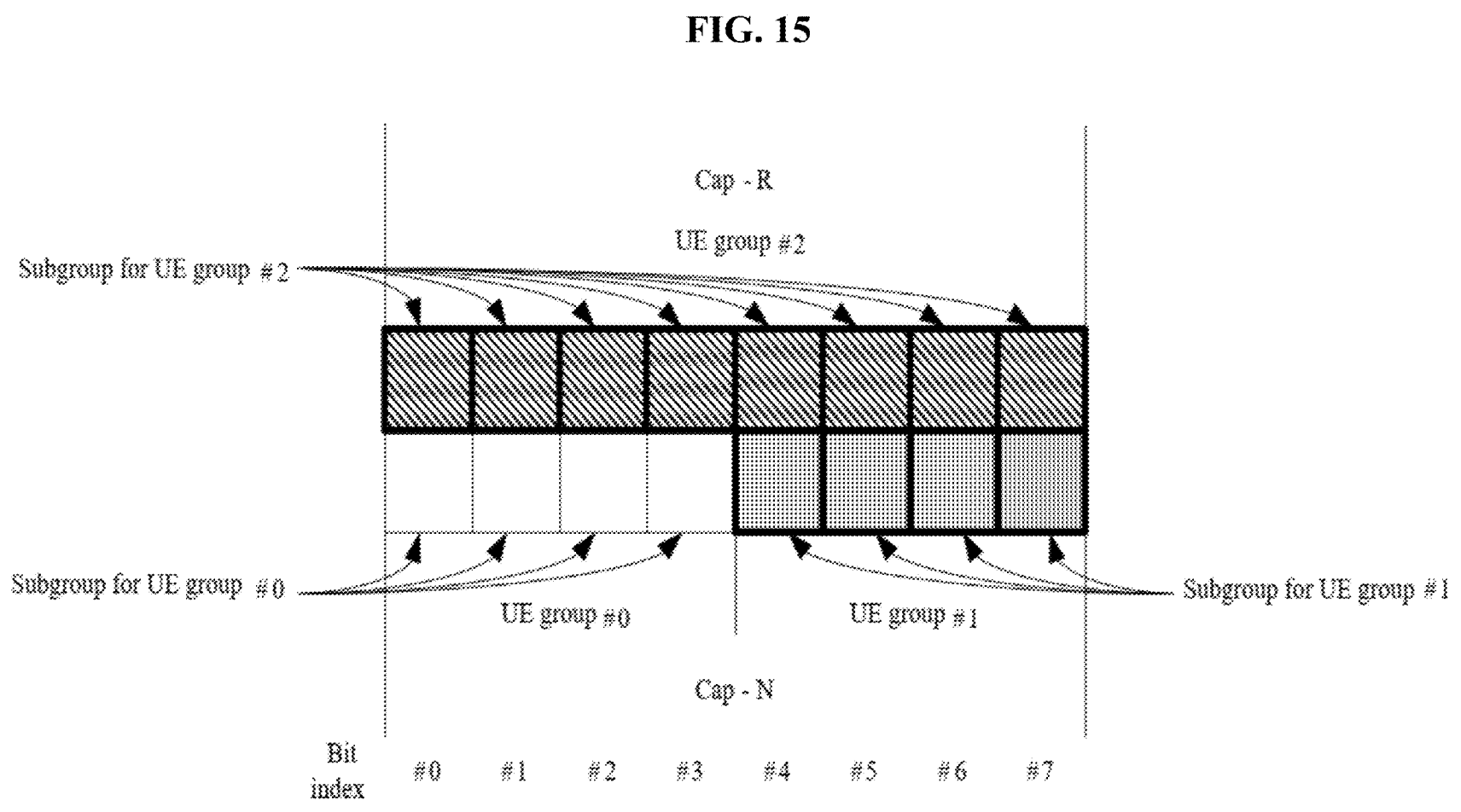

Subgroup for UE group #1

Cap - R

UE group #2

Cap - N

UE group #1

UE group #0

Subgroup for UE group #2

Subgroup for UE group #0

Bit index

#0 #1 #2 #3 #4 #5 #6 #7

METHOD AND DEVICE FOR TRANSMITTING AND RECEIVING RADIO SIGNALS IN WIRELESS COMMUNICATION SYSTEM

CROSS-REFERENCE TO RELATED APPLICATION(S)

This application is the National Stage filing under 35 U.S.C. 371 of International Application No. PCT/KR2022/016366, filed on Oct. 25, 2022, which claims the benefit of earlier filing date and right of priority to Korean Application Nos. 10-2021-0151084, filed on Nov. 5, 2021, and 10-2021-0151096, filed on Nov. 5, 2021, the contents of which are all hereby incorporated by reference herein in their entireties.

TECHNICAL FIELD

The present disclosure relates to a wireless communication system, and more particularly, to a method and apparatus for transmitting and receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

The object of the present disclosure is to provide a method of efficiently performing a wireless signal transmission and reception process and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of receiving a signal by a user equipment (UE) in a wireless communication system. The method may include: receiving configuration information regarding a paging early indication (PEI) for early indicating whether monitoring of paging downlink control information (DCI) on a paging occasion (PO) is required; monitoring the PEI based on the configuration information regarding the PEI; and monitoring the paging DCI on at least one PO associated with the PEI based on detection of the PEI. Based on i) that the UE is a second type UE supporting a smaller maximum bandwidth than a first type UE and ii) that the configuration information regarding the PEI includes first configuration information which is common to the first type UE and the second type UE, the UE may determine a location of a PEI-monitoring occasion (PEI-MO) for monitoring the PEI. In determining the location of the PEI-MO, the UE may identify a location of a first PO for the first type UE based on a second PO for the second type UE and determine the location of the PEI-MO by applying a first offset value obtained from the first configuration information to the identified location of the first PO.

The UE may determine a PO for the first type UE closest to the second PO among POs for the first type UE as the first PO.

The UE may determine a PO for the first type UE closest to the second PO among POs for the first type UE preceding the second PO as the first PO.

The UE may identify the first PO by applying a second offset value to the second PO. The configuration information regarding the PEI may further include second configuration information dedicated to the second type UE, and the UE may obtain the second offset value from the second configuration information.

The PEI may be a PEI common to the first type UE and the second type UE. The at least one PO associated with the PEI may include the first PO for the first type UE and the second PO for the second type UE. The UE may monitor the paging DCI on the second PO rather than the first PO.

The PEI may include a bitmap shared between the first type UE and the second type UE. The UE associates each bit of the bitmap with each subgroup based on a number of second type UE groups and a number of subgroups per each second type UE group.

In another aspect of the present disclosure, provided herein is a computer-readable recording medium having recorded thereon a program for executing the signal reception method described above.

In another aspect of the present disclosure, provided herein is a UE configured to perform the signal reception method described above.

In another aspect of the present disclosure, provided herein is a device configured to control the UE that performs the signal reception method described above.

In another aspect of the present disclosure, provided herein is a method of transmitting a signal by a base station (BS) in a wireless communication system. The method may include: transmitting configuration information regarding a PEI, wherein the PEI early indicates whether monitoring of paging DCI on a PO is required; transmitting the PEI to a UE based on the configuration information regarding the PEI; and transmitting the paging DCI on at least one PO associated with the PEI. Based on i) that the UE is a second type UE supporting a smaller maximum bandwidth than a first type UE and ii) that the configuration information regarding the PEI includes first configuration information which is common to the first type UE and the second type UE, the BS may determine a location of a PEI-MO for transmitting the PEI. The determined location of the PEI-MO may be obtained by applying a first offset value indicated by the first configuration information to a location of a first PO for the first type UE identified based on a second PO for the second type UE.

In a further aspect of the present disclosure, provided herein is a BS configured to perform the signal transmission method described above.

Advantageous Effects

According to an embodiment of the present disclosure, it is possible to provide a structure in which user equipments (UEs) with different capabilities are capable of sharing a paging early indication (PEI) and minimize the overhead of PEI transmission.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIGS. 11 and 12 are diagrams for explaining paging early indication (PEI) transmission according to an embodiment.

FIGS. 13 to 15 are diagrams for explaining configurations of PEI information according to an embodiment.

DETAILED DESCRIPTION

Figure 1:
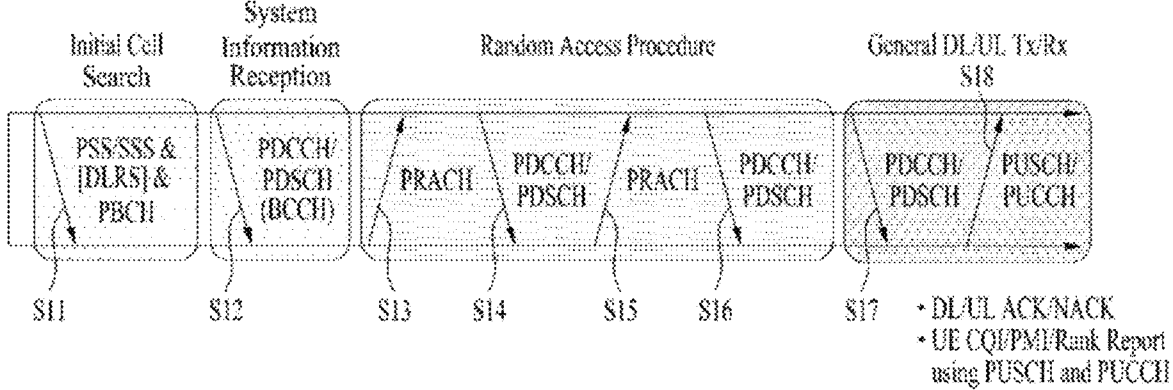
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In an embodiment of the present disclosure, for simplicity, this technology will be referred to as NR (New Radio or New RAT).

For the sake of clarity, 3GPP NR is mainly described, but the technical idea of the present disclosure is not limited thereto.

For the background art relevant to the present disclosure, the definitions of terms, and abbreviations, the following documents may be incorporated by reference.

3GPP LTE

- TS 36.211: Physical channels and modulation
- TS 36.212: Multiplexing and channel coding
- TS 36.213: Physical layer procedures
- TS 36.300: Overall description
- TS 36.321: Medium Access Control (MAC)
- TS 36.331: Radio Resource Control (RRC)

3GPP NR

- TS 38.211: Physical channels and modulation
- TS 38.212: Multiplexing and channel coding
- TS 38.213: Physical layer procedures for control
- TS 38.214: Physical layer procedures for data
- TS 38.300: NR and NG-RAN Overall Description
- TS 38.304: User Equipment (UE) procedures in idle mode and in RRC Inactive state
- TS 38.321: Medium Access Control (MAC)
- TS 38.331: Radio Resource Control (RRC) protocol specification
- TS 37.213: Introduction of channel access procedures to unlicensed spectrum for NR-based access

Terms and Abbreviations

- PSS: Primary Synchronization Signal
- SSS: Secondary Synchronization Signal
- CRS: Cell reference signal
- CSI-RS: Channel State Information Reference Signal
- TRS: Tracking Reference Signal
- SS: Search Space
- CSS: Common Search Space
- USS: UE-specific Search Space
- PDCCH: Physical Downlink Control Channel; The PDCCH is used to represent PDCCHs of various structures which may be used for the same purpose in the following description.
- PO: Paging Occasion
- MO: Monitoring Occasion
- BD: Blind Decoding
- DCI: Downlink Control Information WUS: Wake Up Signal; The WUS may be used to represent other method signals or channels (e.g., a paging early indication (PEI)), which perform a similar function.

PEI_F: PEI Frame (Frame for PEI monitoring)

PEI_O: PEI Occasion (PEI monitoring Occasion (PDCCH monitoring occasion set))

REDCAP: Reduced Capability

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
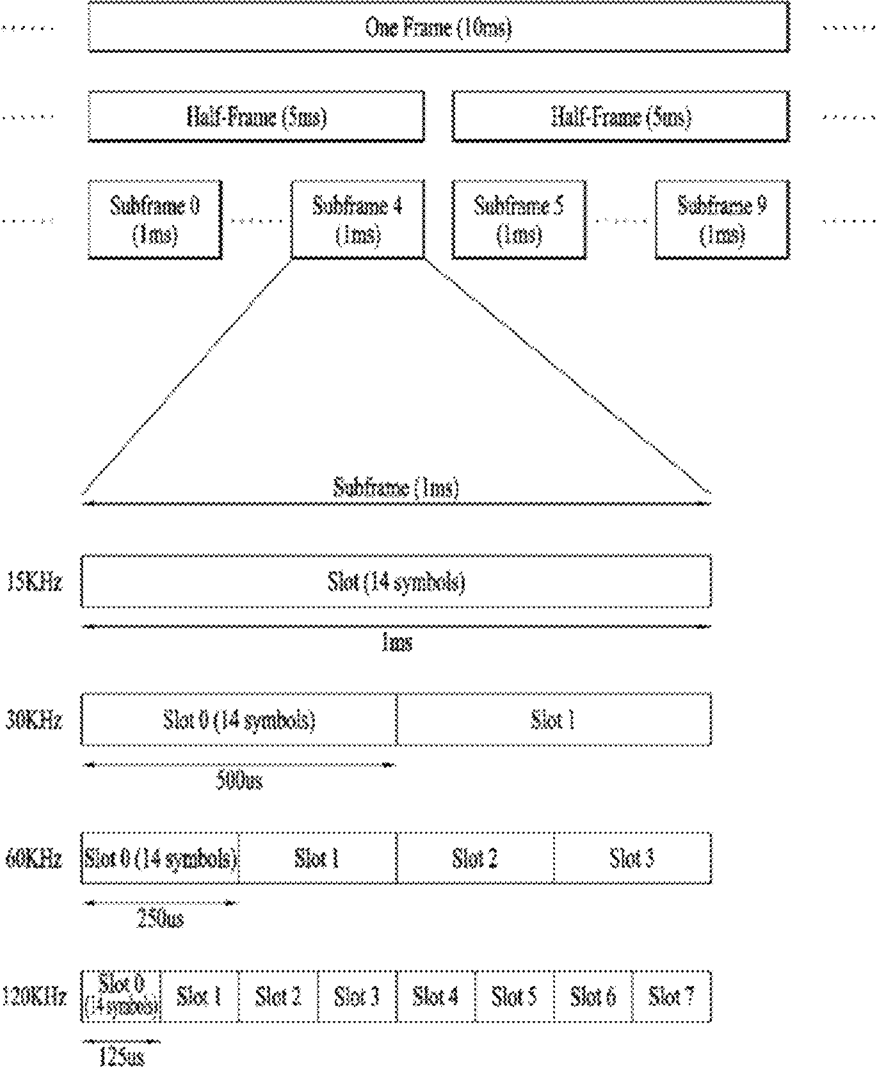
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*$2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*$2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
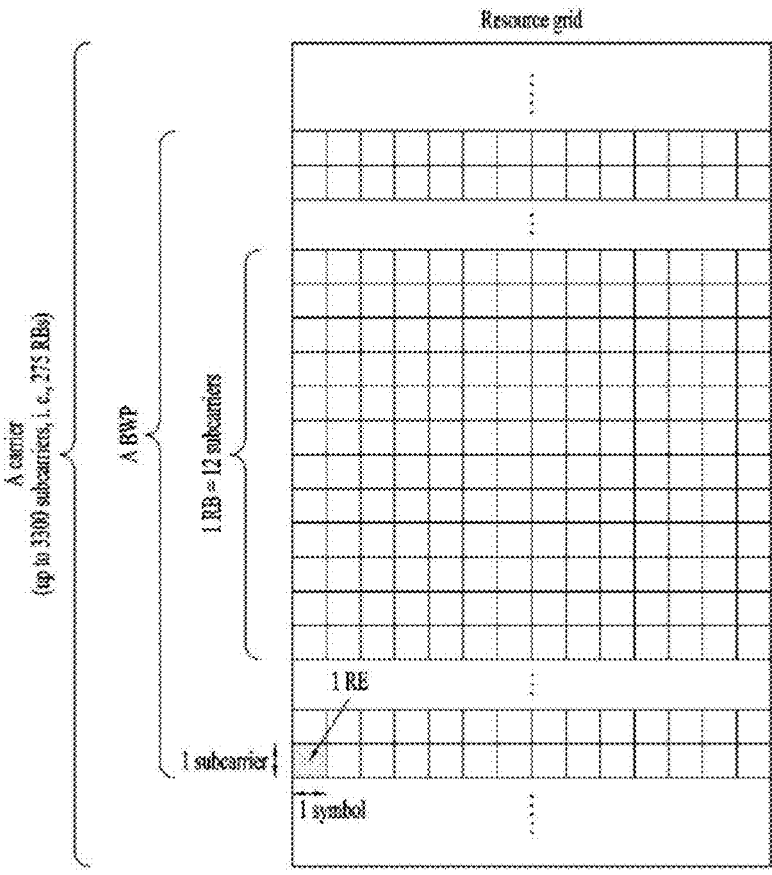
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
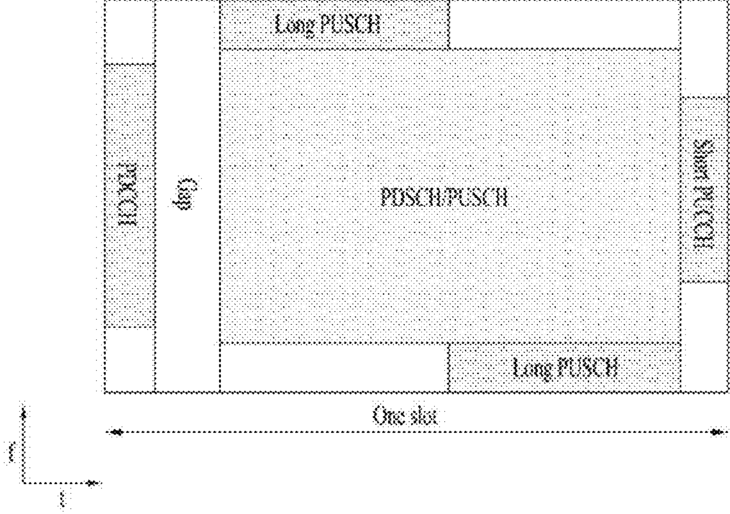
FIG. 4 illustrates exemplary mapping of physical channels in a slot.

FIG. 4 illustrates an example of mapping physical channels in a slot. In an NR system, a frame is characterized by a self-contained structure in which all of a DL control channel, DL or UL data, and a UL channel may be included in one slot. For example, the first N symbols of a slot may be used to carry a DL channel (e.g., PDCCH) (hereinafter, referred to as a DL control region), and the last M symbols of the slot may be used to carry a UL channel (e.g., PUCCH) (hereinafter, referred to as a UL control region). Each of N and M is an integer equal to or larger than 0. A resource area (hereinafter, referred to as a data region) between the DL control region and the UL control region may be used to transmit DL data (e.g., PDSCH) or UL data (e.g., PUSCH). A guard period (GP) provides a time gap for switching from a transmission mode to a reception mode or from the reception mode to the transmission mode. Some symbols at a DL-to-UL switching time in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
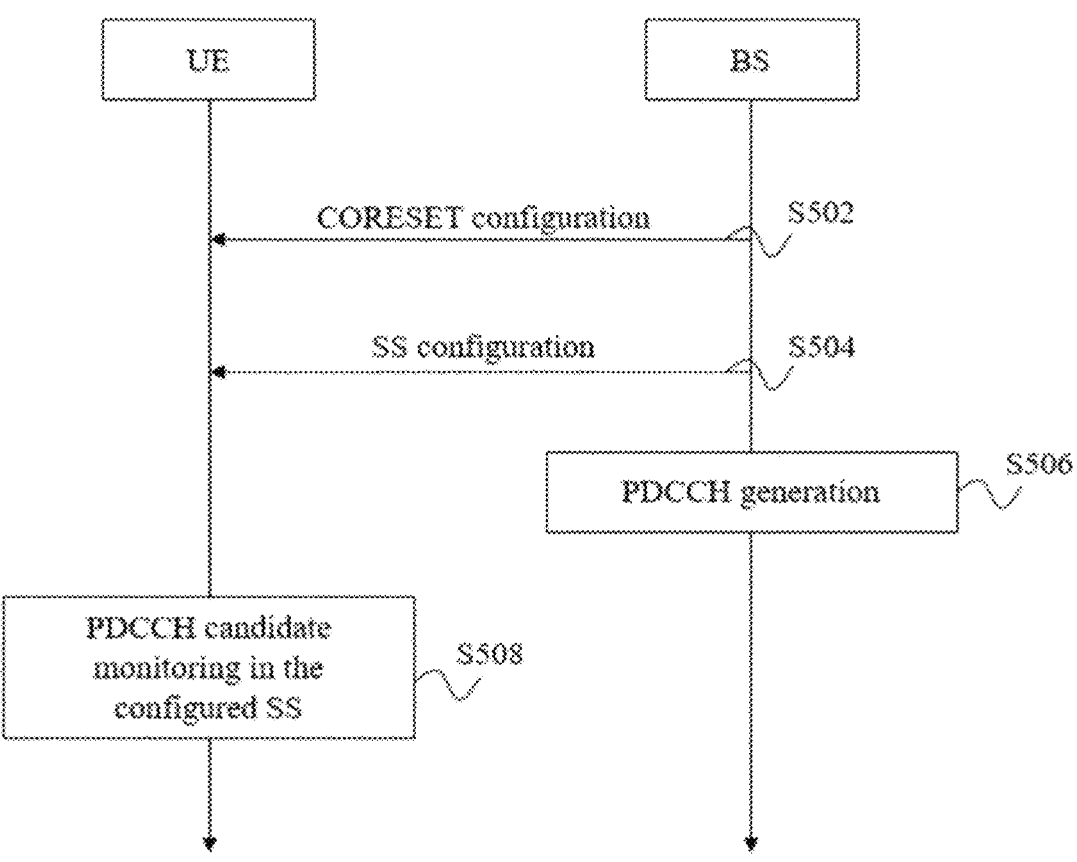
FIG. 5 illustrates an exemplary physical downlink control channel (PDCCH) transmission and reception process.

FIG. 5 illustrates an exemplary PDCCH transmission/reception process.

Referring to FIG. 5, a BS may transmit a control resource set (CORESET) configuration to a UE (S502). A CORESET is defined as a resource element group (REG) set having a given numerology (e.g., a subcarrier spacing (SCS), a cyclic prefix (CP) length, and so on). An REG is defined as one OFDM symbol by one (physical) resource block (P)RB. A plurality of CORESETs for one UE may overlap with each other in the time/frequency domain. A CORESET may be configured by system information (e.g., a master information block (MIB)) or higher-layer signaling (e.g., radio resource control (RRC) signaling). For example, configuration information about a specific common CORESET (e.g., CORESET #0) may be transmitted in the MIB. For example, a PDSCH carrying system information block 1 (SIB1) may be scheduled by a specific PDCCH, and CORESET #0 may be used to transmit the specific PDCCH. Further, configuration information about CORESET #N (e.g., N>0) may be transmitted by RRC signaling (e.g., cell-common RRC signaling, UE-specific RRC signaling, or the like). For example, the UE-specific RRC signaling carrying CORESET configuration information may include, but not limited to, various types of signaling such as an RRC setup message, an RRC reconfiguration message, and/or BWP configuration information. Specifically, a CORESET configuration may include the following information/fields.

controlResourceSetId: Indicates the ID of a CORESET.

frequencyDomainResources: Indicates the frequency-domain resources of the CORESET. The resources are indicated by a bitmap in which each bit corresponds to an RB group (=6 (consecutive) RBs). For example, the most significant bit (MSB) of the bitmap corresponds to a first RB group in a BWP. An RB group corresponding to a bit having a bit value of 1 is allocated as frequency-domain resources of the CORESET.

duration: Indicates the time-domain resources of the CORESET. It indicates the number of consecutive OFDM symbols included in the CORESET. The duration has a value between 1 and 3.

cce-REG-MappingType: Indicates a control channel element (CCE)-to-REG mapping type. An interleaved type and a non-interleaved type are supported.

interleaverSize: Indicates an interleaver size.

pdcch-DMRS-ScramblingID: Indicates a value used for PDCCH DMRS initialization. When pdcch-DMRS-ScramblingID is not included, the physical cell ID of a serving cell is used.

precoderGranularity: Indicates a precoder granularity in the frequency domain.

reg-BundleSize: Indicates an REG bundle size.

tci-PresentInDCI: Indicates whether a transmission configuration index (TCI) field is included in DL-related DCI.

tci-StatesPDCCH-ToAddList: Indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown as separately signaled in FIG. 5, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a UE-specific search space (USS) set or a common search space (CSS) set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: Indicates the ID of an SS.

controlResourceSetId: Indicates a CORESET associated with the SS.

monitoringSlotPeriodicityAndOffset: Indicates a periodicity (in slots) and offset (in slots) for PDCCH monitoring.

monitoringSymbolsWithinSlot: Indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: Indicates the number of PDCCH candidates (one of values 0, 1, 2, 3, 4, 5, 6, and 8) for each AL where AL={1, 2, 4, 8, 16}.

searchSpaceType: Indicates CSS or USS as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI_ format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 10 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is configured as one of an interleaved CCE-to-REG type and a non-interleaved CCE-to-REG type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is set on a CORESET basis.

Figure 6:
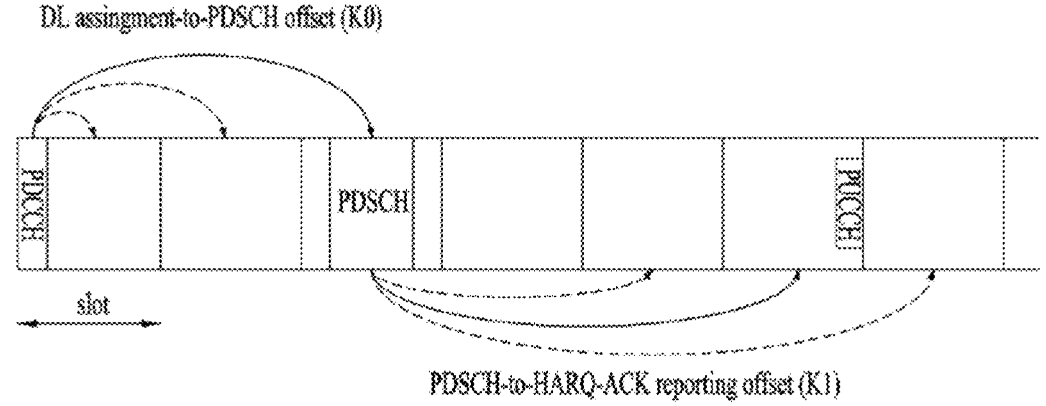
FIG. 6 illustrates an exemplary physical downlink shared channel (PDSCH) reception and acknowledgement/negative acknowledgement (ACK/NACK) transmission process.

FIG. 6 illustrates an exemplary PDSCH reception and ACK/NACK transmission process. Referring to FIG. 6, the UE may detect a PDCCH in slot #n. The PDCCH includes DL scheduling information (e.g., DCI format 1_0 or DCI format 1_1) and indicates a DL assignment-to-PDSCH offset, KG and a PDSCH-HARQ-ACK reporting offset, K1. For example, DCI format 1_0 or DCI format 1_1 may include the following information.

Frequency domain resource assignment: Indicates an RB set allocated to a PDSCH.

Time domain resource assignment: Indicates K0 (e.g., slot offset), the starting position (e.g., OFDM symbol index) of the PDSCH in slot #n+K0, and the duration (e.g., the number of OFDM symbols) of the PDSCH.

PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 7:
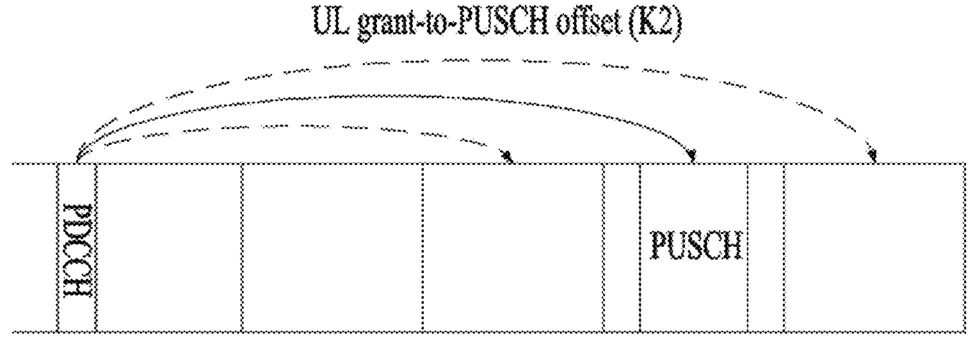
FIG. 7 illustrates an exemplary physical uplink shared channel (PUSCH) transmission process.

FIG. 7 illustrates an exemplary PUSCH transmission procedure. Referring to FIG. 7, the UE may detect a PDCCH in slot #n. The PDCCH includes DL scheduling information (e.g., DCI format 1_0 or 1_1). DCI format 1_0 or 11 may include the following information.

- Frequency domain resource assignment: Indicates an RB set assigned to the PUSCH.
- Time domain resource assignment: Indicates a slot offset K2 and the starting position (e.g., OFDM symbol index) and duration (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Paging

The network may (i) access to UEs in RRC_IDLE, RRC_INACTIVE, and RRC_CONNECTED states by paging messages, and (ii) indicate a system information change and an earthquake and tsunami warning system/commercial mobile alert system (ETWS/CMAS) notification to UEs in the RRC_IDLE and RRC_INACTIVE states and UEs in the RRC_CONNECTED state by short messages. Both a paging message and a short message are transmitted based on a P-RNTI-based PDCCH. The paging message is transmitted on a logical channel, paging control channel (PCCH), whereas the short message is directly transmitted on a physical channel, PDCCH. Because the logical channel, PCCH is mapped to a physical channel, PDSCH, the paging message may be understood as scheduled based on a P-RNTI-based PDCCH.

While the UE stays in the RRC_IDLE state, the UE monitors a paging channel for core network (CN)-initiated paging. In the RRC_INACTIVE state, the UE also monitors the paging channel, for radio access network (RAN)-initiated paging. The UE does not need to monitor the paging channel continuously. Paging discontinuous reception (DRX) is defined as monitoring a paging channel only during one paging occasion (PO) per DRX cycle by a UE in the RRC_IDLE or RRC_INACTIVE state. A paging DRX cycle is configured by the network, as follows.

1) In the case of CN-initiated paging, a default cycle is broadcast in system information.
2) In the case of CN-initiated paging, a UE-specific cycle is configured by NAS signaling.
3) In the case of RAN-initiated signaling, a UE-specific cycle is configured by RRC signaling.

Because all of POs of the UE for CN-initiated signaling and RAN-initiated signaling are based on the same UE ID, the two POs overlap with each other. The number of POs in a DRX cycle may be set by system information, and the network may distribute UEs to the POs based on IDs.

When the UE is in the RRC_CONNECTED state, the UE monitors a paging channel in each paging occasion (PO) signaled by system information, for an SI change indication and a PWS notification. In bandwidth adaptation (BA), the RRC_CONNECTED UE monitors only a paging channel in an active BWP in which a configured CSS is located.

In shared spectrum channel access, additional PDCCH monitoring occasions may be configured in a PO of the UE, for paging monitoring. However, when the UE detects a P-RNTI-based PDCCH transmission in its PO, the UE does not need to monitor subsequent PDCCH monitoring occasions in the PO.

To reduce power consumption, the UE may use DRX in the RRC_IDLE and RRC_INACTIVE states. The UE monitors one PO per DRX cycle. A PO is a set of PDCCH monitoring occasions, and may include multiple time slots (e.g., subframes or OFDM symbols) in which paging DCI may be transmitted. One paging frame (PF) is one radio frame and may include one or more POs or the starting points of one or more POs.

In a multi-beam operation, the UE assumes that the same paging message and the same short message are repeated in all transmission beams. The paging message is the same for both of RAN-initiated paging and CN-initiated paging.

Upon receipt of RAN-initiated paging, the UE initiates an RRC connection resume procedure. Upon receipt of CN-initiated paging in the RRC_INACTIVE state, the UE transitions to the RRC_IDL state and notifies the NAS of the CN-initiated paging.

A PF and a PO for paging are determined in the following manner:

An SFN for the PF is determined by:

$$(SFN + \text{PF\_offset}) \bmod T = (T \; div \; N) * (\text{UE\_ID} \bmod N)$$

An index i_s indicating the index of the PO is determined by:

$$\text{i\_s} = \text{floor}(\text{UE\_ID}/N) \bmod Ns$$

The following parameters may be used to calculate the PF and i_s above.

T: The DRX cycle of the UE (T is determined by the smallest of UE-specific DRX values (if configured by RRC and/or an upper layer) and a default DRX value broadcast in system information. In the RRC_IDLE state, if UE-specific DRX is not configured by an upper layer, the default value is applied).

N: Number of total paging frames in T

Ns: Number of POs for a PF

PF_offset: Offset used for PF determination

UE_ID: 5G-S-TMSI mod 1024

WUS (Wake-up signal)/PEI (Paging Early Indication)

In LTE Rel-15 Narrowband Internet of Things (NB-IoT) and Machine Type Communication (MTC), a wake-up signal (WUS) was introduced to save power of a UE. The WUS is a signal indicating preliminarily whether there is an actual paging transmission in a paging SS at a specific position. When the BS wants to transmit paging in a PO at a specific position, the BS may transmit a WUS at WUS transmission position(s) associated with the PO. The UE monitors the WUS transmission positions associated with the PO at the specific position. Upon detection of the WUS at the WUS transmission position(s), the UE may expect that paging will be transmitted in the PO, whereas when failing to detect the WUS at the WUS transmission position(s), the UE may not expect paging in the PO. The gain of power saving may be achieved by this operation. In LTE Rel-16 NB-IoT and MTC, a UE-group WUS was introduced to increase the power saving gain of the Rel-15 WUS. The UE-group WUS may advantageously reduce an unnecessary wakeup probability of a UE by using a WUS transmission position and sequence determined based on the UE-group ID of the UE.

Figure 8:
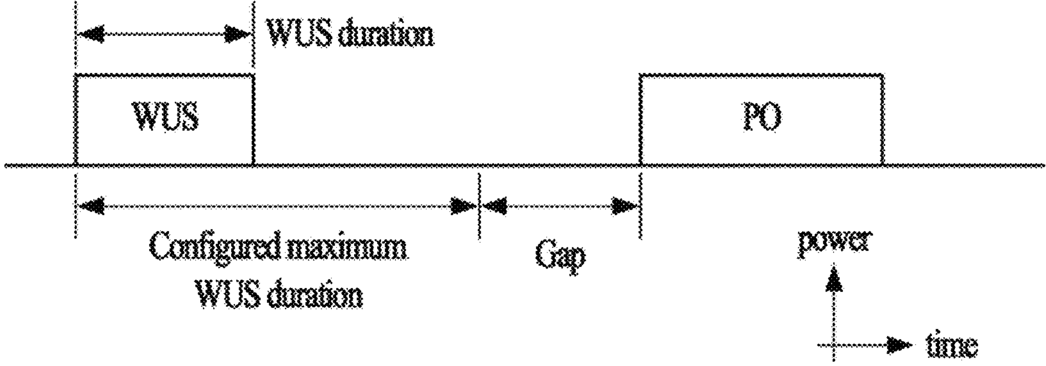
FIG. 8 illustrates a long term evolution (LTE)-based wake-up signal.

FIG. 8 is a diagram illustrating a WUS in an LTE system. Referring to FIG. 8, in MTC and NB-IoT, the WUS may be used to reduce power consumption related to paging monitoring. The WUS is a physical layer signal indicating whether a UE is supposed to monitor a paging signal (e.g., an MPDCCH/NPDCCH scrambled with a P-RNTI) according to a cell configuration. For a UE which is not configured with eDRX (i.e., configured only with DRX), the WUS may be associated with one PO (N=1). On the contrary, for a UE configured with eDRX, the WUS may be associated with one or more POs (N≥1). Upon detection of the WUS, the UE may monitor N POs after being associated with the WUS. When failing to detect the WUS, the UE may maintain sleep mode by skipping PO monitoring until the next WUS monitoring. The UE may receive WUS configuration information from the BS and monitor the WUS based on the WUS configuration information. The WUS configuration information may include, for example, a maximum WUS duration, the number of consecutive POs associated with the WUS, and gap information. The maximum WUS duration may refer to a maximum time period during which the WUS may be transmitted, and may be expressed as a ratio to a maximum repetition number (e.g., Rmax) related to a PDCCH (e.g., MPDCCH or NPDCCH). Although the UE may expect repeated WUS transmissions within the maximum WUS duration, the number of actual WUS transmissions may be less than a maximum number of WUS transmissions within the maximum WUS duration. For example, the number of WUS repetitions may be small for a UE in good coverage. A resource/occasion in which the WUS may be transmitted within the maximum WUS duration is referred to as a WUS resource. The WUS resource may be defined as a plurality of consecutive OFDM symbols by a plurality of consecutive subcarriers. The WUS resource may be defined as a plurality of consecutive OFDM symbols by a plurality of consecutive subcarriers in a subframe or slot. For example, the WUS resource may be defined as 14 consecutive OFDM symbols by 12 consecutive subcarriers. Upon detection of the WUS, the UE does not monitor the WUS until a first PO associated with the WUS. When the WUS is not detected during the maximum WUS duration, the UE does not monitor a paging signal in POs associated with the WUS (or the UE remains in the sleep mode).

In a communication system such as NR, it may be indicated by a paging early indication (PEI) (e.g., a PEI based on a sequence or DCI) whether the UE should monitor paging DCI in a PO or whether paging DCI is provided. When the UE succeeds in detecting the PEI, the UE monitors the paging DCI (and/or a PDSCH carrying a corresponding paging message). When failing in detecting the PEI, the UE may skip monitoring of the paging DCI in the PO.

Paging Early Indication for REDCAP UEs

In communication systems such as LTE and NR, paging is used for the purpose of triggering RRC setup, system information modification, and/or a PWS/ETWS notification. The UE monitors a PDCCH at the position of a PO configured by the BS and, when detecting DCI scrambled with a P-RNTI, performs an operation indicated by the DCI.

In LTE Rel-15 NB-IoT and MTC, the WUS was introduced to save power of a UE. The WUS is a signal indicating whether an actual paging transmission exists in a PO at a specific position. When the BS wants to transmit paging in the PO at the specific position, the BS may transmit the WUS at WUS transmission position(s) associated with the PO. The UE monitors the WUS transmission position(s) associated with the PO at the specific position. Upon detection of the WUS at the WUS transmission position(s), the UE may expect that paging will be transmitted in the PO. When the UE fails to detect the WUS at the WUS transmission position(s), the UE does not expect paging in the PO. This operation may bring the gain of power saving. In LTE Rel-16 NB-IoT and MTC, the UE-group WUS was introduced to increase the power saving gain of the Rel-15 WUS. The UE-group WUS is advantageous in that the unnecessary wake-up probability of a UE may be reduced by using a WUS transmission position and sequence determined based on the UE group ID of the UE.

In Rel-16 NR, a DCI-based power saving scheme has been introduced for the purpose of supporting power saving in a connected mode. To this end, a new DCI format, DCI format 2-6 has been introduced. Specifically, the BS indicates the position of bits to be monitored by the UE in DCI format 2-6, and the UE determines power saving operations in an active time duration based on information on the bits at the corresponding position.

As discussed in Rel-16 NB-IoT and MTC, when a UE in an idle/inactive mode monitors a PO, unnecessary wake-up may occur if paging for other UEs sharing the same PO is transmitted. The unnecessary wake-up may lead to increases in UE power consumption. In current NR, the DCI-based scheme for preventing the connected mode UE from performing unnecessary monitoring has been introduced to achieve the power saving effect as described above. However, the same (or similar) method has not been defined for the idle/inactive mode. In Rel-17 NR, the introduction of a PEI is being discussed as a means to provide information related to paging ahead of a PO for the purpose of UE power saving.

One of the power saving effects achieved based on a PEI is reducing unnecessary wake-ups of the UE through a UE subgroup indication. Specifically, the PEI may be configured with a DCI format, and the corresponding DCI may include fields representing UE group and/or subgroup indication information.

In NR, the support of reduced capability (REDCAP) UEs is being discussed. The REDCAP UE may have a lower bandwidth (BW) capability compared to a normal NR UE (referred to as a normal UE) be primarily used for requirements focused on lower cost and lower complexity. The REDCAP UE may require improvement in power saving efficiency either at the same level or with even higher requirements compared to the normal UE. Therefore, the adoption of enhanced power saving features planned for Rel-17 NR may be required. In particular, since the PEI is capable of providing significant power saving effects when the UE is in the idle/inactive mode, it may be desirable to apply the PEI to the REDCAP UE.

If the transmission and reception operation of the REDCAP UE is supported in a BWP distinct from the initial BWP applied to the normal UE (such a BWP is referred to as separate BWP), the REDCAP UE in the initial/inactive mode may perform operations such as paging and RACH in the separate BWP. In this case, it is necessary to consider the location and temporal distinction within the time domain of a BWP where the PO/PEI for the paging procedure of the REDCAP UE is supported Based on the above discussion, provided herein are methods by which a REDCAP UE determines a PEI occasion (PEI-O) and necessary information therefor. In this case, the PEI-O where the PEI is transmitted may be defined as a set of consecutive PDCCH monitoring occasions, similarly to the PO. In this specification, the term PEI-O is used to refer to a set of locations where the UE attempts to detect DCI or sequences for monitoring the PEI.

The following proposals relate to (i) determining a BWP where a REDCAP UE is capable of expecting to receive a PEI when a separate BWP is configured for the REDCAP UE, (ii) determining configuration information regarding a PEI-O in the determined BWP, and/or (iii) determining the location of the PEI-O based on the determined configuration information regarding the PEI-O. The proposed methods may ensure both power saving efficiency for the REDCAP UE and reliability in PEI reception and also provide resource overhead efficiency and scheduling flexibility for the BS.

While the present disclosure primarily focuses on the operations for a PEI and a PO related thereto, the present disclosure is not limited thereto. Specifically, the present disclosure may be generally applied to a signal/channel for indicating the transmission status of a specific channel and the specific channel.

Figure 9:
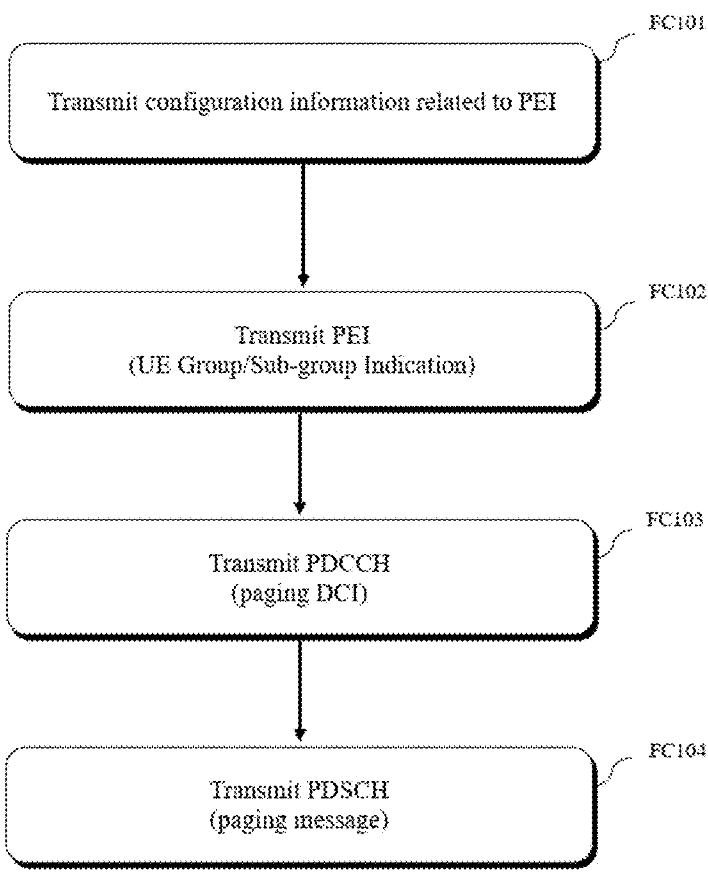
FIGS. 9 and 10 respectively illustrate flowcharts of base station (BS) operations and user equipment (UE) operations according to an embodiment.

FIG. 9 illustrates BS operations according to an embodiment.

Referring to FIG. 9, the BS may generate and transmit configuration information related to a PEI and paging (FC101). In this case, the configuration information may include information on BWP(s) where operations for the PEI and paging are performed depending on the capability of the UE and/or information on a monitoring occasion for the PEI and paging configured at the location of the BWP(s). For example, the configuration information may be transmitted using higher layer signaling (e.g., SIB or RRC signaling).

If there is paging information that the BS desires to transmit to UE(s), the BS may transmit the PEI based on the configuration information (FC102).

Subsequently, the BS may generate paging DCI and transmit the paging DCI on a PDCCH, and the PDCCH may be transmitted on configured PO(s) (FC103). The location of the PO(s) may be determined based on the capability of the UE intended to receive the paging DCI. The paging DCI may include scheduling information for a paging message.

Thereafter, the BS may transmit a PDSCH containing the paging message based on the scheduling information on the PDSCH transmitted over the PDCCH (FC104). If there is no paging message that the BS needs to transmit, this operation may be omitted.

Figure 10:
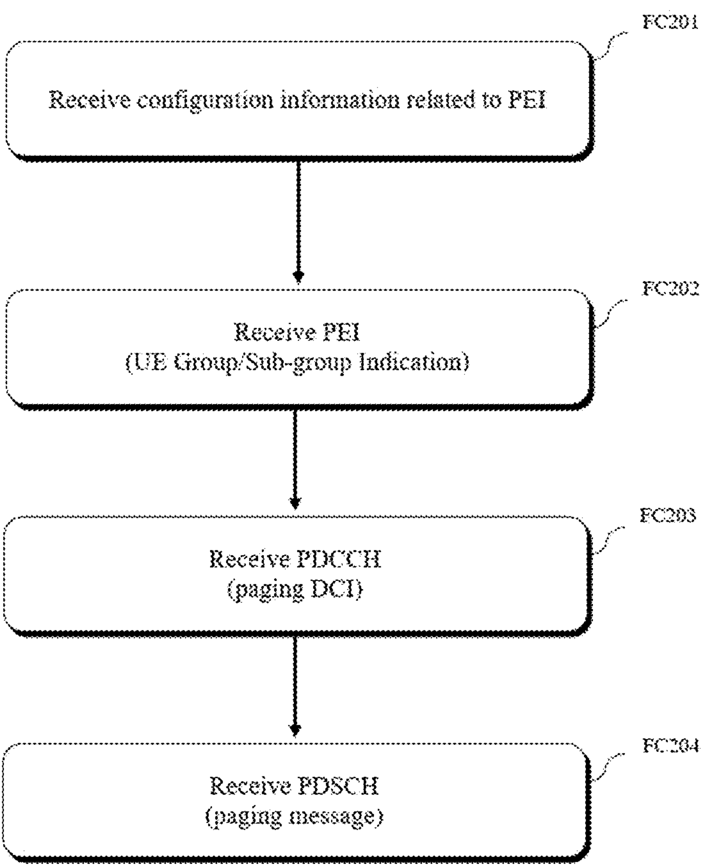

FIG. 10 illustrates UE operations according to an embodiment.

Referring to FIG. 10, the UE may receive configuration information related to a PEI and/or PO from the BS (FC201). The configuration information may include information on BWP(s) where operations for the PEI and paging are performed and information on a monitoring occasion for the PEI and paging configured at the location of the BWP(s). The UE may classify and (selectively) receive necessary information depending on the capability of the UE. For example, the configuration information may be received via a higher layer signal (e.g., SIB or RRC signaling).

The UE may attempt to detect and receive the PEI at the location of a configured BWP(s) and PEI-O set based on the received PEI-related configuration information (FC202).

Subsequently, if the UE is instructed to perform reception on a PO corresponding to a UE group/subgroup to which the UE belongs based on PEI information, the UE may perform PDCCH monitoring for detecting paging DCI at the location of the PO (FC203). The location of the PO may be determined based on the configuration information received by the UE and the capability of the UE. In this case, if the paging DCI includes scheduling information for receiving a paging message, the UE may receive the scheduling information.

Thereafter, when the UE is instructed to receive the paging message corresponding to the UE subgroup thereof over the PDCCH and receives scheduling information on a PDSCH therefor, the UE may expect to receive the PDSCH including the paging message based on the scheduling information on the PDSCH transmitted over the PDCCH (FC204). If it is indicated in the previous step that there is no PDSCH transmission to the UE, the UE may skip the operation.

The proposed methods may each be implemented independently, or one or more of the proposed methods may be implemented in combination.

Herein, a signal or channel configured to indicate the transmission status of a paging PDCCH/PDSCH on a specific PO is defined as a PEI. The present disclosure primarily focuses on a PEI configured to provide information in the form of DCI. However, the proposed methods may also be applicable to other PEI forms (e.g., distinguishing information based on sequences).

Hereinafter, the present disclosure will be described by assuming that the functions of a PEI and paging are provided by a single BS for UEs distinguished by two types of capabilities, which are expressed as Cap-N and Cap-R. In this case, Cap-R may refer to the capability of a UE supporting REDCAP, while Cap-N may refer to the capability of a general UE that does not support REDCAP.

The term BWP-N refers to a BWP configured for the Cap-N UE to perform DL operations in the idle/inactive mode, while the term BWP-R refers to a BWP configured for the Cap-R UE to perform DL operations in the idle/inactive mode. In this case, the BWP-N may refer to a BWP determined based on the configuration of CORESET #0 provided by an MIB, which may correspond to a BWP where general UEs (e.g., UEs without REDCAP capability) perform DL operations in the idle/inactive mode. In addition, the BWP-R may be a separate BWP that is separately designated for supporting the REDCAP UE. If configured, the REDCAP UE may perform DL operations required in the idle/inactive mode such as paging and/or RACH at the location of the corresponding BWP based on information configured by the BS. The proposed methods may be generally applied even when the BWP varies depending on a set of UEs (e.g. capabilities) classified according to specific conditions.

Determination of BWP for Transmitting PEI for Cap-R UE

If a BWP where a Cap-R UE performs DL operations in the idle/inactive state is configured differently from a DL BWP of a Cap-N UE, a method of determining the DL BWP for the UE to receive a PEI and paging is required. For example, when a PO for the Cap-R UE is configured in a BWP-R, the power saving gain of the UE and functions to be performed by the UE may vary depending on the location of a PEI-O for PEI transmission. Therefore, provided herein is a method for selecting a BWP for PEI transmission for the Cap-R UE, which is advantageous for improving reception performance, including power consumption efficiency and paging latency.

Proposal 1-1) Determination of Location of PEI Transmission BWP Based on Configuration of NCD-SSB.

If the UE is configured with a plurality of DL BWPs and the UE is incapable of receiving DL signals/channels in the plurality of BWPs simultaneously due to the UE capability, the UE may need to perform frequency retuning to receive the DL signals/channels on different BWPs. However, the frequency retuning causes power consumption of the UE, and a gap time required to perform the frequency retuning may be required.

To support DL operations performed on a BWP-R, a non-cell-defining SSB (NCD-SSB) may configured in the BWP-R. If a PO for the Cap-R UE is configured in the BWP-R configured with the NCD-SSB, the UE may perform automatic gain control (AGC) and time/frequency synchronization operations using the NCD-SSB to prepare for reception of a paging PDCCH/PDSCH. If no NCD-SSB is configured in the BWP-R, the UE may perform the AGC and time/frequency synchronization operations using a cell-defining SSB (CD-SSB) existing on a BWP-N. The CD-SSB may include CORESET/SS configuration information regarding a PDCCH, which schedules a PDSCH carrying system information such as SIB1, and the NCD-SSB may not include the corresponding CORESET/SS configuration information.

Considering these conditions, if the PO for the Cap-R UE is configured in the BWP-R, the location of a BWP for PEI may be determined depending on whether and how the NCD-SSB is configured. As a more specific example, if the NCD-SSB is configured in the BWP-R, the BWP for PEI may be determined based on a combination of one or more of the following options.

Option 1-1-1) Whether NCD-SSB is Available for Serving Cell Measurement

Whether the NCD-SSB configured in the BWP-R is available for serving cell measurement may be used as a condition for determining the BWP for PEI. As a specific example, if the NCD-SSB configured in the BWP-R is allowed to be used for measurement, a PEI for the Cap-R UE may be transmitted in the BWP-R. On the other hand, if the NCD-SSB configured in the BWP-R is not allowed to be used for measurement, the PEI for the Cap-R UE may be transmitted in the BWP-N. As a more specific example, whether the serving cell measurement is allowed may be determined by an explicit indication indicated by the BS through higher layer signaling. Alternatively, whether the serving cell measurement is allowed may be implicitly determined by parameters used to configure the NCD-SSB.

According to Option 1-1-1, considering that the serving cell measurement needs to be performed at least once every DRX cycle according to the requirements for the UE in the idle/inactive mode, the UE may configure the BWP for the serving cell measurement to match the BWP for PEI, thereby minimizing the frequency retuning.

Option 1-1-2) Periodicity of NCD-SSB

The BWP for PEI may be determined based on the periodicity of the NCD-SSB in the BWP-R. As a specific example, whether the periodicity of NCD-SSB repetitions is above (or exceeds) a specific threshold may be used as a condition for determining the BWP for PEI.

As a specific example of determining the threshold, the periodicity of the CD-SSB in the BWP-N may be used. For example, if the periodicity of the NCD-SSB in the BWP-R is shorter than or equal to the periodicity of the CD-SSB in the BWP-N (i.e., if the density of the NCD-SSB is higher than or equal to the density of the CD-SSB), the PEI for the Cap-R UE may be transmitted in the BWP-R. On the other hand, if the periodicity of the NCD-SSB in the BWP-R is longer than the periodicity of the CD-SSB in the BWP-N (i.e., if the density of the NCD-SSB is low than the density of the CD-SSB), the PEI for the Cap-R UE may be transmitted in the BWP-N. Alternatively, in a more general form, whether the threshold exceeds or falls below N times (where N is any rational number) of the NCD-SSB periodicity and CD-SSB periodicity may be used as a condition for determining a BWP.

As another specific example of determining the threshold, a predefined time duration value (or the number of units in the time domain) may be used. For example, when the threshold is determined to be X ms, if the periodicity of the NCD-SSB in the BWP-R is shorter than or equal to X ms, the PEI for the Cap-R UE may be transmitted in the BWP-R. On the other hand, if the periodicity of the NCD-SSB in the BWP-R is longer than X ms, the PEI for the Cap-R UE may be transmitted in the BWP-N. For instance, the value of X ms may be the periodicity (e.g., 20 ms) of an SSB assumed for SSB detection before the UE checks the configured SSB periodicity.

Option 1-1-2 may be suitable for enabling transmission of the PEI on a BWP with higher SSB density. This is to ensure smooth execution of serving cell measurement, AGC, and/or time/frequency synchronization operations that need to be performed by the UE in the idle/inactive mode on every paging DRX cycle Proposal 1-2) Determination of Location of BWP Based on PO Configuration on BWP-R A PEI-O may be determined as a relative position by applying an offset to the position of a PO. For example, the following methods may be used: (1) a method of determining a PEI frame (PEI-F) by applying the offset at the frame level based on a paging frame (PF) and configuring an additional parameter (e.g., parameter for designating a first PDCCH monitoring occasion) to determine the PEI-O within the PEI-F; (2) a method of applying the offset based on an L-th SSB preceding the PO/PF; or (3) a method of applying the offset at the symbol/slot level based on the PO. The configuration of the offset may facilitate execution of AGC and time/frequency synchronization based on an SSB before the UE receives a PEI and execution of additional time/frequency synchronization during a duration for preparing for PO monitoring after receiving the PEI. The offset between the PEI-O and PO may be a factor that greatly affects the power consumption and paging reception performance of the UE.

Depending on the configuration of a PO in the BWP-R for the Cap-R UE and the configuration of a PO in the BWP-N for the Cap-N UE, the location of a BWP suitable for the Cap-R UE to monitor the PEI may vary. The reason for this is that a relative relationship with the CD-SSB or NCD-SSB and a PEI-to-Multiple-PO relationship (i.e., relationship with multiple POs where information is capable of being indicated by one PEI) may be affected by the configuration of the PO. Considering the conditions, provided is a method of determining a BWP where the PEI-O of the Cap-R UE is configured by considering the configuration of the PO for the Cap-R UE and the configuration of the PO for the Cap-N UE when the PO for the Cap-R UE is configured in the BWP-R and the PO for the Cap-N UE is configured in the BWP-N.

As a specific example, if the PO for the Cap-R UE is configured in the BWP-R, and if the PO for the Cap-R UE is configured at the same time-domain location as the PO for the Cap-N UE configured in the BWP-N, a PEI for the Cap-R UE may be transmitted on BWP-N. As an additional method, to reduce unnecessary signaling overhead, the PEI-O of the Cap-R UE and the PEI-O of the Cap-N UE may be configured in the same location. The reason for this is to share the PEI-O based on a common PEI offset (i.e. offset parameter(s) used to configure the PEI-G) if the POs configured in the two BWPs have the same location. In this case, from the perspective of the BS, resource overhead due to PEI transmission and signaling overhead for providing configuration information regarding the PEI-O may be reduced. In the proposed method, configuring the POs at the same location in the time domain may mean that among parameters used to configure POs, all parameters for determining resources in the time domain (e.g., $PF_{offset}$, first PDCCH monitoring occasion, etc.) are the same. In this case, if the number of POs per paging DRX cycle is set differently for the Cap-R UE and Cap-N UE (e.g., if the time-domain location of the PO for the Cap-R UE is included in some of all the time-domain locations of the POs for the Cap-N UE or vice versa), the method proposed above may also be applied.

As a specific example, if the PO for the Cap-R UE is configured in the BWP-R, and if the PO for the Cap-R UE has a timed-domain location different from the PO for the Cap-N UE configured in the BWP-N, the PEI for the Cap-R UE may be transmitted in the BWP-R. When a single PEI offset is applied in common to the BWP-N and BWP-R, the Cap-R UE and Cap-N UE have different PEI-O locations. This may aim to prevent PDCCH blocking due to an overlap between PEI-Os and avoid concentration of traffic in a specific BWP. In the proposed method, configuring the POs at different locations in the time domain may mean that among parameters used to configure POs, all or some of the parameters for determining resources in the time domain (e.g., $PF_{offset}$, first PDCCH monitoring occasion, etc.) are different.

Considering the relationship between the PEI-O and PO, Proposal 1-2 may be suitable for sharing the PEI-O to reduce the resource overhead of the BS without additional signaling overhead if possible. Additionally, Proposal 1-2 may be advantageous to offload resources for PEI transmission to other BWPs if traffic becomes concentrated on a specific BWP.

Configuration of PEI-O when PEI for Cap-R UE is Transmitted in BWP-N

When transmission of a PEI for a Cap-R UE is configured in a BWP-N, a method of determining a PEI-O where which the Cap-R UE expects to receive the PEI needs to be determined. To achieve benefits in improving reception performance including power consumption efficiency and paging latency of the UE, provided are methods of determining parameters for configuring the PEI-O when the PEI for the Cap-R UE is transmitted in the BWP-N.

The following proposals (Proposal 2-1, Proposal 2-2, Proposal 2-3, and Proposal 2-4) relate to a structure in which the PEI for the Cap-R UE is transmitted in the BWP-N. Even if there is no separate explanation, the above structure is assumed.

Proposal 2-1) Reuse of PEI-O-Related Parameters Configured for Cap-N UE

To reduce resource overhead, the BS may not provide separate PEI-O configuration information for the Cap-R UE. In this case, when PEI configuration information for a Cap-N UE is provided through a higher layer signal (e.g., provided by SIB or RRC signaling), the PEI-O of the Cap-R UE may be determined based on PEI-O-related parameters configured for the Cap-N UE. For example, the PEI-O-related parameters may include parameter(s) for specifying a PEI offset. Additionally/alternatively, parameters for determining a PEI-to-Multiple-PO relationship may be included. In this case, a reference for applying the PEI-O-related parameters may be a PO for the Cap-R UE.

If a PO for the Cap-N UE shares the same location in the time domain as the PO for the Cap-R UE, the location of the PEI-O may be shared.

When the support of separate PEI-O-related parameters for the Cap-R UE is not defined in specifications, if the BS desires to distinguish between the PEI-O of the Cap-N UE and the PEI-O of the Cap-R UE in the time domain, separate PO-related parameters for the Cap-R UE (e.g., $PF_{offset}$, first PDCCH monitoring occasion, etc. are configured differently) may be provided, and the PO-related parameters for the Cap-R UE may have values different from PO-related parameters for the Cap-N UE.

Proposal 2-1 enables sharing of parameters for PEI-O configurations among UEs with different capabilities, thereby saving the signaling overhead of the BS.

Proposal 2-2) Determination of PEI-O-Related Parameters for Cap-R UE Based on PO Configuration Information for Cap-N UE and PO Configuration Information for Cap-R UE In terms of resource overhead, it may be advantageous for the Cap-N UE and Cap-R UE to share the PEI-O of the Cap-N UE. However, due to differences in services and wireless communication environments provided between the Cap-N UE and Cap-R UE, the configurations of the POs for the Cap-N UE and Cap-R UE needs to be configured differently. In this case, if the configuration of a single PEI offset parameter is used to determine the location of the PEI-O of the Cap-N UE and the location of the PEI-O of the Cap-R UE, a method for the Cap-N UE and Cap-R UE to share the PEI-O is required. For example, there is provided a method of using PO configuration information for the Cap-N UE and Cap-R UE to enable the Cap-N UE and Cap-R UE to share the location of the PEI-O through a single PEI offset parameter. To this end, one or more of the following options may be combined.

Option 2-2-1) Method of Using Differences Between Offset Parameters for Determining PFs/POs of Cap-N UE and Cap-R UE The UE may determine the locations of a PF and PO using PO-related offset parameters configured through a higher layer signal (e.g., SIB). The PO-related offset parameters may include information on $PF_{offset}$ and information on a first PDCCH monitoring occasion. If the PO-related offset parameters are configured differently for the Cap-N UE and Cap-R UE, the PO for the Cap-N UE and the PO for the Cap-R UE may be configured at different locations. Based on these characteristics, the location of the PEI-O of the Cap-R UE may be determined by considering the difference between the offset parameter for determining the PO for the Cap-N UE and the offset parameter for determining the PO for the Cap-R UE. In this case, the location of the PEI-O of the Cap-R UE may be determined based on the PO for the Cap-R UE and the value of a PEI offset. As a specific example, an additional offset value may be computed based on the difference between the parameter $PF_{offset}$ for determining the PF of the Cap-N UE (hereinafter $PF_{offset\_N}$) and the parameter $PF_{offset}$ for determining the PF of the Cap-R UE (hereinafter $PF_{offset\_R}$), and the location of the PEI-O of the Cap-R UE may be determined based on the sum of the PEI offset and the calculated additional offset value. For example, when the additional offset value calculated through the PF parameters is defined as $Add_{offset}$, the size of the offset configured between the PO and PEI-O of the Cap-N UE is defined as $PEI_{offset\_N}$, and the size of the offset configured between the PO and PEI-O of the Cap-R UE is defined as $PEI_{offset\_R}$, the method of determining the PEI-O of the Cap-R UE may be expressed as Equation 1 below. Equation 1 is only an example for explanation, and the content proposed in the present disclosure is not limited to Equation 1.

$$\mathrm{Add}_{offset} = PF_{\mathrm{offset\_R}} - PF_{\mathrm{offset\_N}} \qquad \text{[Equation 11]}$$

$$PEI_{\mathrm{offset\_R}} = PEI_{\mathrm{offset\_N}} + \mathrm{Add}_{offset}$$

In addition to (or instead of) using the $PF_{offset}$ parameters to determine $Add_{offset}$, a slot-level offset may be applied. To this end, configuration information regarding the first PDCCH monitoring occasion of the Cap-N UE and configuration information regarding the first PDCCH monitoring occasion of the Cap-R UE may be used to determine the additional offset value.

Figure 11:
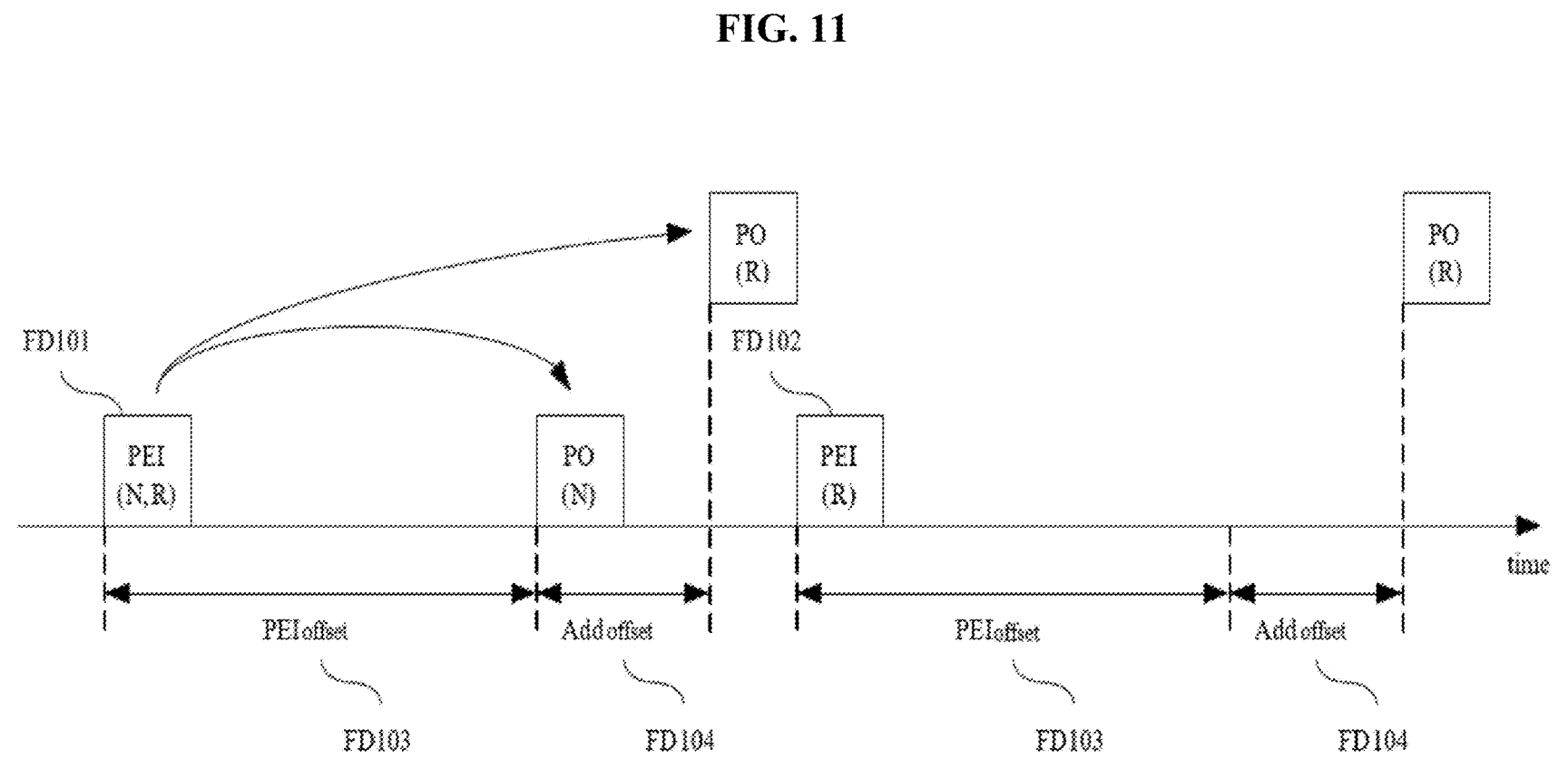

Referring to FIG. 11, when the difference between the offset parameter of a PO (PO(N)) of the Cap-N UE and the offset parameter of a PO (PO(R)) of the Cap-R UE is $Add_{offset}$ (FD104), the location of a PEI-O of the Cap-N UE is determined by the sum of PEI offset (FD103) and $Add_{offset}$ (F104). Because Option 2-2-1 is the method of determining an offset value based on configured parameters rather than the actual PO of the UE, some PEI-Os may provide information on both the Cap-N UE and Cap-R UE depending on the configuration of the PO (FD101). Alternatively, there may be a location of the PEI-O that provides information only to the Cap-N UE (or Cap-R UE) (FD102).

Option 2-2-1 provides an additional offset capable of determining the PEI-O of the Cap-R UE based on only the parameters configuring the PO without adding signaling overhead, thereby achieving a structure for the Cap-N UE and Cap-R UE to share the PEI-O.

Option 2-2-2) Determination of PEI-O Based on PO of Cap-N UE Closest to PO of Cap-R UE As another method of determining the PEI-O of the Cap-R UE based on the PO configuration of the UE, the PO of the Cap-N UE adjacent to the PO of the Cap-R UE may be used as a reference point to determine the location of the PEI-O of the Cap-R UE. As a method of determining the PO of the Cap-N UE adjacent to the PO of the Cap-R UE, the location of the PO closest thereto among preceding POs of the Cap-N UE in the time domain may be selected based on the location of the PO that the Cap-R UE needs to monitor.

If the proposed method is used and if there are no POs of the Cap-N UE among a plurality of POs for the Cap-R UE, the plurality of POs for the Cap-R UE may share the same PEI-O location.

Figure 12:
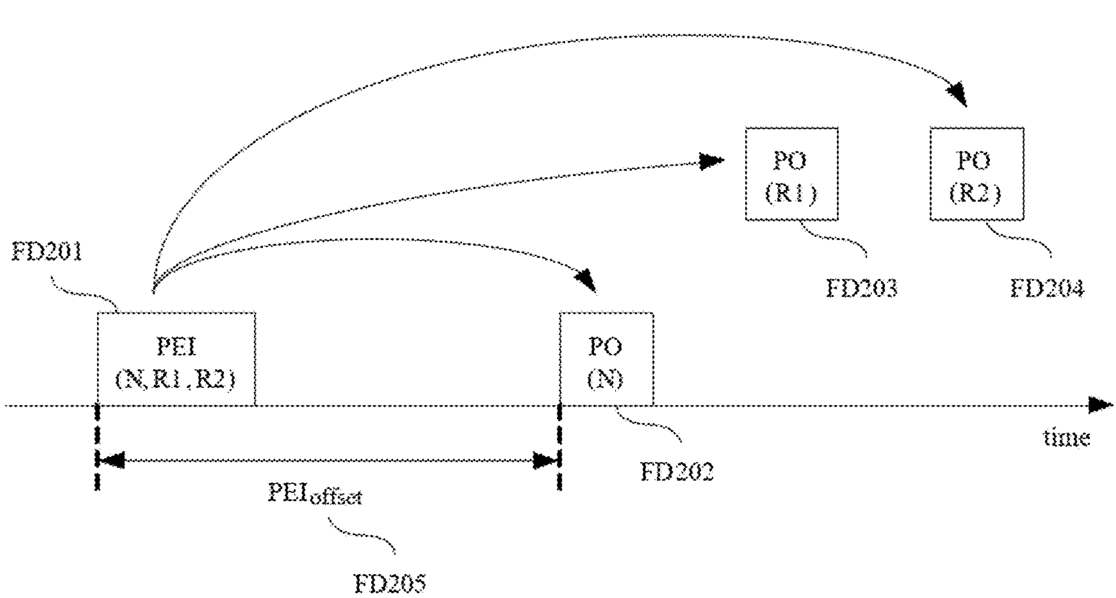

Referring to FIG. 12, it is assumed that one PO (FD202) of the Cap-N UE is used as a reference for two POs (FD203 and FD204) of the Cap-R UE. A PEI (FD201) may be transmitted on a PEI-O determined by applying $PEI_{offs}$et (FD205) based on the PO of the Cap-N UE. The location of the PEI-O may be commonly configured for the one PO (FD202) of the Cap-N UE and the two POs (FD203 and FD204) of the Cap-R UE.

According to Option 2-2-2, the PEI-O of the Cap-R UE may be determined based on only the parameters for configuring the PO without additional signaling overhead, thereby providing a structure where the Cap-N UE and Cap-R UE are capable of sharing the PEI-O. Additionally, resource overhead due to the PEI may be saved by preventing the configuration of the PEI-O solely for the Cap-R UE, Proposal 2-3) Method of Separately Configuring PEI-O-Related Parameters of Cap-R UE To ensure scheduling flexibility from the perspective of the BS, it may be considered to configure the PEI-O of the Cap-R UE in an independent structure from that of the Cap-N UE. If different PEIs are used depending on UE capabilities, UEs may require transmission of different PDCCHs. If a plurality of POs correspond to a single PEI-O, the probability of PDCCH blocking therefor may increase. Alternatively, if a single PEI provides common information for UEs with different capabilities, the DCI payload of the PEI may increase, which leads to a decrease in PDCCH decoding reliability. To prevent this issues, the proposal may be used to intentionally disperse the positions of PEI-Os. On the other hand, the proposal may also be used to reduce constraints on the configurations and locations of the POs for the Cap-N UE and Cap-R UE, thus ensuring scheduling flexibility for the BS.

The BS may provide parameters for PEI-O configuration information for the Cap-R UE separately from the Cap-N UE via higher layer signaling. The parameters for PEI-O configuration information may belong to the same category as parameters required for configure the PEI-O of the Cap-N UE. For example, the parameters for PEI-O configuration information could include information on a PEI offset and a PEI-to-Multiple-PO relationship.

The provision of the proposed information may be an optional feature selected by the BS. If the BS provides no PEI-O-related parameters for the Cap-R UE, other methods (e.g., Proposal 2-1 or Proposal 2-2) may be used as the default operation.

Proposal 2-3 ensures the scheduling flexibility of the BS in configuring the PEI-O for the Cap-R UE, thereby reducing constraints on the configuration of the PO and PEI-O for the Cap-N UE and the configuration of the PO and PEI-O for the Cap-R UE.

Proposal 2-4) Method of Determining PEI-O of Cap-R UE Based on Relative Position of PEI-O of Cap-N UE If the Cap-N UE and Cap-R UE share a PEI-O, resource overhead may be reduced from the perspective of the BS. However, it may cause an increase in PEI DCI overhead due to provision of information on multiple POs through a single PEI or an increase in false alarms due to paging from other UE groups/subgroups. Therefore, considering a wireless communication environment where the BS provides services based on the characteristics of UEs, a method of determining whether to share a PEI-O among UEs with different capabilities may be required. In addition, it is necessary to consider a method of minimizing UE power consumption and BS signaling overhead while providing desired functionality. Considering this situation, provided herein is a method of determining the location of the PEI-O of the Cap-R UE relative to the location of the PEI-O of the Cap-N UE.

As a specific example, the PEI-O of the Cap-R UE may be determined in relation to an offset with the PEI-O of the Cap-N UE. For example, the offset may be defined as a gap between the starting position (e.g., first PDCCH monitoring occasion for PEI) of the PEI-O of the Cap-R UE and the starting position of the PEI-O of the Cap-N UE. If the value of the offset is 0, the PEI-O of the Cap-R UE may be configured to be contiguous with the PEI-O of the Cap-N UE.

In this case, the offset may have a predetermined value defined in specifications or provided by the BS through higher layer signaling (e.g., SIB or RRC signaling).

To apply the proposed method, a method of determining the PEI-O of the Cap-N UE, which is used as the reference, may be required. Regarding the determination of the PEI-O of the Cap-N UE, which is used as the reference, the conditions proposed in other methods (e.g., Proposal 2-1, Proposal 2-2, and Proposal 2-3) may be combined and used.

Proposal 2-4 may minimize signaling overhead if the BS aims to separate the PEI-O of the Cap-N UE and the PEI-O of the Cap-R UE.

Configuration of PEI-O when PEI for Cap-R UE is Transmitted in BWP-R

When transmission of a PEI for the Cap-R UE is configured in a BWP-R, it is necessary to determine determining a PEI-O for the Cap-R UE. To improve reception performance including UE power consumption efficiency and paging latency, provided are parameters for configuring the PEI-O when the PEI for the Cap-R UE is transmitted in the BWP-R.

In the proposed methods below (Proposal 2-1, Proposal 2-2, Proposal 2-3, and Proposal 2-4), a structure where the PEI for the Cap-R UE is transmitted in the BWP-R will be described. The above structure is assumed even in the absence of separate explanations. Even if there is no separate explanation, the above structure is assumed.

Proposal 3-1) Reuse of PEI-O-Related Parameters Configured for Cap-N UE

To reduce resource overhead, the BS may not provide separate PEI-O configuration information for the Cap-R UE. For example, PEI configuration information for the Cap-N UE may be provided through higher layer signaling (e.g., SIB or RRC signaling), the Cap-R UE may determine the PEI-O using the PEI-O-related parameters configured for the Cap-N UE. The PEI-O-related parameters may include parameter(s) for specifying a PEI offset and/or parameters for determining a PEI-to-Multiple-PO relationship. The PEI-O-related parameters may be applied based on a PO of the Cap-R UE.

If the proposed method is used and the PEI-O-related parameters of the Cap-N UE used to determine a PEI-O of the Cap-R UE are limited to parameters for a PEI offset, or if information on the PEI-to-Multiple-PO relationship configured for the Cap-N UE is not applied identically to the Cap-R UE, there is a need to define a method for determining the PEI-to-Multiple-PO relationship to configure the PEI-O of the Cap-R UE. The configuration of signals and channels (e.g., SSB pattern, PO configuration, etc.) required during configured paging and PEI transmission processes may vary between the BWP-N and BWP-R. Considering that the PEI-to-Multiple-PO configuration may vary depending on the configuration of the signals and channels, it may be necessary to adaptively modify the PEI-to-Multiple-PO structure. As a specific example, the PEI-to-Multiple-PO relationship configured for the Cap-R UE may be determined based on a combination of one or more of the following options.

Option 3-1-1) Method of Considering Pattern of CD-SSB in BWP-N and Pattern of NCD-SSB in BWP-R As discussed above, an SSB may be used for AGC and time/frequency synchronization in reception of a PEI and paging PDCCH/PDSCH. The UE may receive the SSB before the start of the PEI-O and maintain a wake-up state (or maintain a light/micro sleep state) after completing necessary operations to monitor the PEI-O. Generally, as the duration of the wake-up time of the UE increases, power consumption may increase compared to the deep sleep state. Therefore, it may be expected that the closer the location of the PEI-O to the SSB, the higher the power saving efficiency.

Considering this situation, if an NCD-SSB in the BWP-R is configured to have a longer periodicity than a CD-SSB in the BWP-N, the gap between the PEI-O of the Cap-R UE and the SSB may also be longer than the gap between the PEI-O of the Cap-N UE and the SSB. In addition, if the PO configuration for the BWP-N is the same as the PO configuration for the BWP-R, the PEI-Os for some Cap-R UEs may have a longer distance from the NCD-SSB compared to the PEI-Os for other Cap-R UE, leading to an imbalance in power saving efficiency.

To address these issues, the PEI-to-Multiple-PO relationship of the Cap-R UE may be determined based on a relative ratio between the periodicity of the CD-SSB and the periodicity of the NCD-SSB. For example, if the periodicity of the CD-SSB is denoted as $T_{CD}$, the periodicity of the NCD-SSB is denoted as $T_{NCD}$, and the PEI-to-Multiple-PO relationship configured for the Cap-N UE in the BWP-N is denoted as $N_{N\text{-}PO}$, the PEI-to-Multiple-PO relationship configured for the Cap-R UE in the BWP-R, denoted as N_R-PO, may be expressed as shown in Equation 2.

$$N_{R-PO} = N_{N-PO} * T_{NCD}/T_{CD} \quad \text{[Equation 2]}$$

According to Option 3-1-1, if PO configuration information for the Cap-R UE in the BWP-R is not provided separately and if PO configuration information for the Cap-N UE in the BWP-N is reused such that the same PO density is configured, all Cap-R UEs may receive PEIs from positions adjacent to the NCD-SSB with no additional signaling overhead, thereby improving the average power saving efficiency of UEs.

Option 3-1-2) Method of Considering Configuration of PO for Cap-N UE in BWP-N and PO for Cap-R UE in BWP-R If the BS is capable of separately providing configuration information for the PO for the Cap-R UE in the BWP-R and if the configuration of the PO differs from the configuration of the PO for the Cap-N UE in the BWP-N, the degree of traffic congestion caused by the POs may vary between the BWP-N and BWP-R. Therefore, it is necessary to consider a method of configuring the PEI-O in consideration of the configuration of POs configured in each BWP in order to regulate the traffic that may occur in each BWP. In addition, according to the ongoing discussions on the PEI design in current Rel-17 NR, a structure where multiple POs configured within one PF correspond to one PEI may be introduced. Therefore, if the numbers of POs configurable within one PF (i.e., Ns), which are respectively indicated by configuration information regarding the PO in the BWP-N and configuration information regarding the PO in BWP-R, differ from each other, it should be considered that the PEI-to-Multiple-PO relationship may also vary depending on the BWP.

Considering the above situation, the PEI-to-Multiple-PO relationship for the Cap-R UE may be determined based on the ratio of the number of POs of the Cap-R UE configured per unit interval and the number of POs of the Cap-N UE configured per unit interval. As a specific method, assuming that the number of POs configured within one PF (i.e. Ns) is used as the number of POs per unit interval, the value of Ns in the BWP-N is denoted as $N_{SN}$, the value of Ns in the BWP-R is denoted as $N_{SR}$, and the PEI-to-Multiple-PO relationship configured for the Cap-N UE in the BWP-N is denoted as $N_{N\text{-}PO}$, the PEI-to-Multiple-PO relationship $N_{R\text{-}PO}$ configured for the Cap-R UE in the BWP-R may be expressed as show in Equation 3.

$$N_{R-PO} = N_{N-PO} * T_{SR}/N_{SN} \quad \text{[Equation 3]}$$

According to Option 3-1-2, if PO configuration information for the Cap-R UE in the BWP-R is provided separately, which is different from PO configuration information for the Cap-N UE in the BWP-N, and if the PO density is different, all Cap-R UEs may receive PEIs from positions adjacent to the NCD-SSB with no additional signaling overhead, thereby improving the average power saving efficiency of UEs.

Option 3-1-3) Configuration of PEI-to-Multiple-PO Relationship Through Explicit Signaling from BS To ensure scheduling flexibility of the BS, while PEI offset-related parameters for the Cap-R UE may be configured to share values configured for the Cap-N UE, the PEI-to-Multiple-PO relationship may be configured separately for the Cap-R UE only. Option 3-1-3 may be an optional feature. That is, Option 3-1-3 may be selectively determined by the BS. If the BS provides no PEI-to-Multiple-PO parameter for the Cap-R UE, other methods proposed in the present disclosure (e.g., Option 3-1-1, Option 3-1-2, or application of PEI-to-Multiple-PO parameters configured for the Cap-N UE) may be applied as the default operation.

Proposal 3-2) Configuration of PEI-O-Related Parameters Separately for Cap-R UE

To ensure scheduling flexibility of the BS, PEI-O-related parameters for the Cap-R UE may be provided separately by the BS. In this case, PEI configuration information for the Cap-R UE may be provided through a higher layer signal (e.g., via SIB or RRC signaling), and PEI-O-related parameters configured for the Cap-R UE may be used to determine the PEI-O of the Cap-R UE. For example, the PEI-O-related parameters may include parameter(s) for specifying PEI offsets. Additionally/alternatively, the PEI-O-related parameters may include parameters for determining the PEI-to-Multiple-PO relationship. In this case, a reference for applying the PEI-O-related parameters may be the PO of the Cap-R UE.

The above proposal may be an optional feature, which may be selected by the BS. If the BS provides no PEI-O-related parameter for the Cap-R UE, other methods proposed in the present disclosure (e.g., Proposal 3-1) may be applied as the default operation.

Proposal 3-2 may improve the scheduling flexibility of the BS because by providing the capability to configure a PEI-O configuration for Cap-R UE independently of parameters for Cap-N UE.

PEI DCI Design for REDCAP UEs

Hereinafter, the design and information configuration of PEI DCI for a REDCAP UE to use a PEI will be described. According to the proposed method, the PEI may guarantee power consumption efficiency and resource overhead efficiency for normal and REDCAP UEs.

Referring again to FIG. 9, the BS may generate and transmit configuration information related to a PEI and paging (FC101). The information may include configuration information regarding a UE group/subgroup indication field included in PEI DCI, which may vary depending on the UE capability. For example, the configuration information may be transmitted through a higher layer signal (e.g., SIB or RRC signaling).

If there is paging information that the BS desires to transmit to specific UE(s), the BS may transmit the PEI based on the configuration information (FC102). If the PEI corresponds to a plurality of UE groups, the PEI may include UE group information. If the PEI is capable of including information on a plurality of UE subgroups, the PEI may include UE subgroup information. The information on UE groups/subgroups may be provided based on the distinction of UE capabilities.

The BS may generate paging DCI and transmit the paging DCI over a PDCCH. The PDCCH may be transmitted on configured PO(s) (FC103). In this case, the positions of the configured POs may vary depending on the capability of the UE supposed to receive the paging DCI. If there is a paging message that the BS desires to transmit, the BS may include scheduling information for transmission of the paging message in the paging DCI.

Thereafter, if there is a paging message that the BS desires to transmit, the BS may transmit a PDSCH including the paging message based on the scheduling information on the PDSCH transmitted over the PDCCH (FC104). If there is no paging message that the BS should transmit, the operation may be omitted.

Referring again to FIG. 10, the UE may receive configuration information related to a PEI and PO from the BS (FC201). The information may include configuration information regarding a UE group/subgroup indication field included in PEI DCI. The UE may classify and receive necessary information depending on the capability of the UE. For example, the configuration information may be received via a higher layer signal (e.g., SIB or RRC signaling).

The UE may attempt to detect and receive the PEI based on the received PEI-related configuration information (FC202). If the PEI corresponds to a plurality of UE groups, the UE may expect to receive information on a UE group from the PEI. If the PEI is capable of including information on a plurality of UE subgroups, the UE may expect to receive information on a UE subgroup based on the PEI. The UE may distinguish and receive information corresponding to the capability thereof based on the information on UE groups/subgroups.

Subsequently, if the UE is instructed to perform reception at the PEI reception location on a PO corresponding to a UE group/subgroup to which the UE belongs through PEI information, the UE may perform PDCCH monitoring to detect paging DCI at the location of the PO (FC203). The location of the PO may be determined based on the configuration information received by the UE and the UE capability thereof. In this case, if scheduling information for receiving a paging message exists in the paging DCI, the UE may receive the scheduling information.

Thereafter, when the UE is instructed to receive the paging message corresponding to the UE subgroup thereof over the PDCCH and receives scheduling information on a PDSCH therefor, the UE may expect to receive the PDSCH including the paging message based on the scheduling information on the PDSCH transmitted over the PDCCH (FC204). If it is indicated in the previous step that there is no PDSCH transmission to the UE, the UE may skip the operation.

Provision of PEI Based on UE Capability

Proposal 4: Method of Determining Configuration of PEI DCI Based on Parameters Configured Depending on Capability of Each UE.

When a PO of the Cap-N UE and a PO of the Cap-R UE are separately configured by dedicated parameters, the transmission location of a PEI (hereinafter PEI-O) may also be separately configured. In this case, parameters configured for the Cap-N UE may be used as a reference for configuring a PEI DCI field of the Cap-N UE, and parameters configured for the Cap-R UE may be used as a reference for configuring a DCI field of the Cap-R UE. For example, the following parameters: paging-related parameters, one PEI to multiple PO mapping, and/or number of UE subgroup, etc. may be considered as the parameters.

Specifically, if a PO and PEI-O for the normal UE are provided in the initial BWP, and if a PO and PEI-O for the REDCAP UE are provided in a separate BWP. Based on the above reference, the size of PEI DCI for the REDCAP UE and the size of PEI DCI for the normal UE may be determined separately.

In Proposal 4, if there are no provided separate parameters for the REDCAP UE, the configuration of the PEI DCI for the REDCAP UE may follow the paging and PEI-related parameters provided for the normal UE.

Proposal 4A

To distinguish information provided to UEs with different capabilities, an RNTI applied to the PEI for the Cap-N UE and an RNTI applied to the PEI for the Cap-R UE may be configured to have different values. To this end, the BS may inform the RNTI values that each capability UE may expect through higher layer signaling. Alternatively, the RNTI values may be differentiated according to predefined criteria specified in the specification. In this case, the UE may recognize information intended by the transmitted PEI using an RNTI value scrambled with a CRC applied to DCI while decoding a PDCCH for PEI transmission.

The proposed method may be applied even when the PEI for the Cap-N UE and the PEI for the Cap-R UE are transmitted on the same time/frequency resource. As a specific example, even if a BWP where the REDCAP UE expects to receive a PEI is the same as a BWP where the normal UE expects to receive a PEI (e.g., initial BWP), PEI information may be distinguished based on RNTIs.

In this case, if PEI transmission for a plurality of capability UEs is required and time/frequency resources for the PEI transmission overlap each other, a method of configuring at least one RNTI to a common RNTI may be considered to prevent latency in paging reception at a specific capability UE, which is caused when PEI transmission with a specific RNTI blocks PEI transmission with a different RNTI. As a specific example, the RNTI used for PEI transmission may be configured with three values, which are defined as an RNTI-N, an RNTI-R, and an RNTI-C, respectively. When PEI transmission is required only for the Cap-N UE, the RNTI-N may be used. When PEI transmission is required only for the Cap-R UE, the RNTI-R may be used. When PEI transmission is required for both the Cap-N UE and Cap-R UE, the RNTI-C may be used. In this case, the Cap-N UE may be configured to perform PDCCH decoding using both the RNTI-N and RNTI-C during the PEI reception. Similarly, the Cap-R UE may use both the RNTI-R and RNTI-C for PDCCH decoding during the PEI reception. This method may prevent blocking between PEIs for UEs with different capabilities when the PEIs are transmitted. Additionally, the method may enhance the power saving gain of the UE by preventing a specific capability UE from receiving a PEI unnecessarily.

Method for UEs with Different Capabilities to Receive Same PEI

From the perspective of the UE, when PEI transmission is performed individually for UEs with different capabilities, there may be a power saving gain due to reduced false alarms as the UE grouping effectiveness increases. On the other hand, from the perspective of the BS, there may be a disadvantage that the probability of PDCCH blocking may increase along with an increase in PEI resource overhead (i.e., when the transmission positions of different PDCCHs overlap, there may be constraints in PDCCH scheduling). To prevent such an issue, a method of designing PEI DCI such that the Cap-N UE and Cap-R UE receive information from the same PEI may be considered.

Proposal 5: Method of Distinguishing Between Subgroup Bitmap for Each PO of Cap-N UE and Subgroup Bitmap for Each PO of Cap-R UE To reduce the impact of paging between UEs with different capabilities and prevent an increase in power consumption due to unnecessary paging monitoring, a method of distinguishing bits in PEI DCI depending on the UE capability may be used. As a specific example, if a UE group/subgroup indication field in PEI DCI capable of being used for UE group/subgroup indication is configured in the form of a bitmap, the total size of the bitmap may be determined according to Equation 4 below.

$$B_T = M_N * N_N + M_R * N_R \quad \text{[Equation 4]}$$

Figure 13:
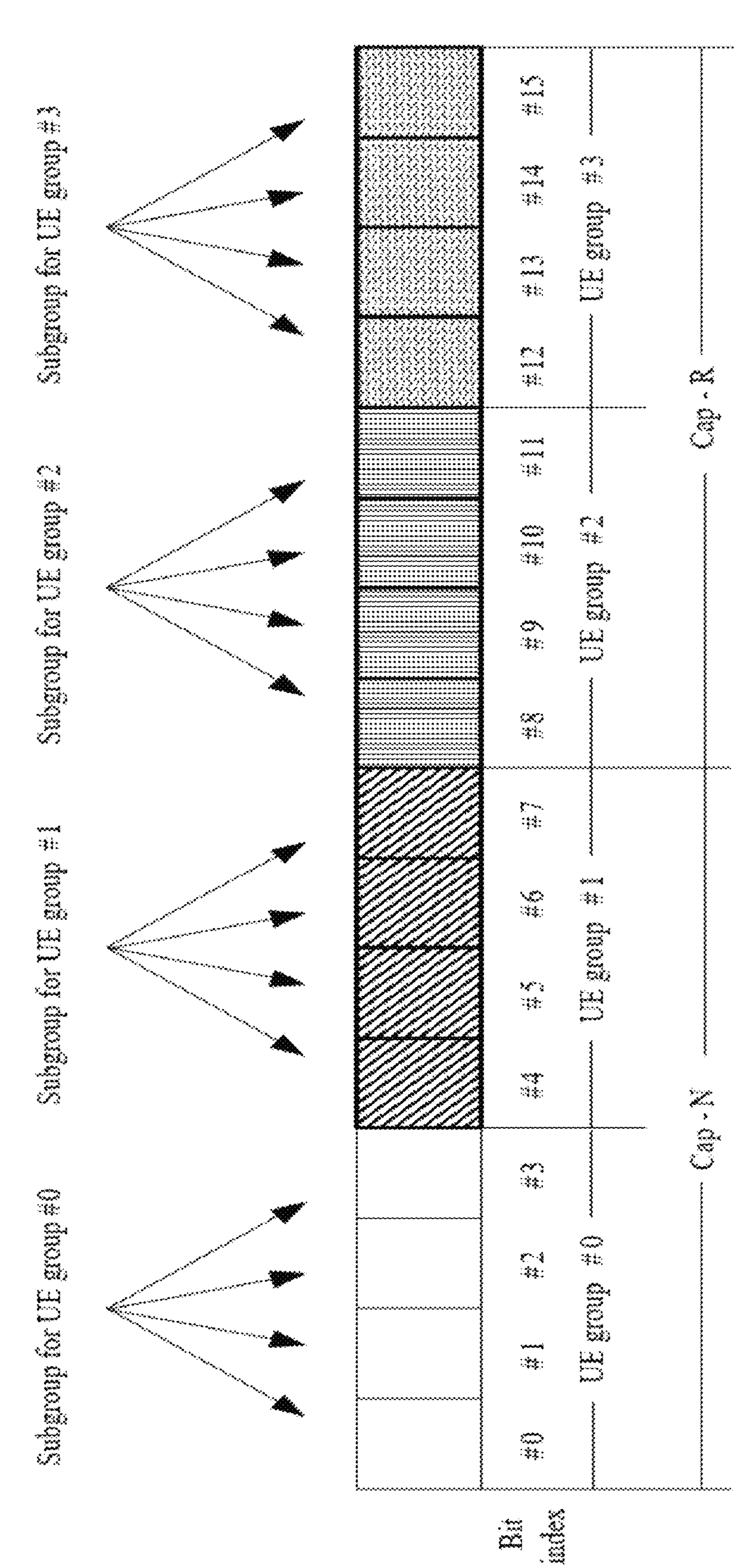

In Equation 4, $M_N$ and $N_N$, which are parameters configured for the normal UE, denote the number of POs where one PEI is capable of providing wake-up information and the number of UE subgroups distinguishable per PO, respectively, and $M_R$ and $N_R$, which are parameters configured for the REDCAP UE, denote the number of POs where one PEI is capable of providing wake-up information and the number of UE subgroups distinguishable per PO, respectively. FIG. 13 illustrates an example of configuring a UE group/subgroup indication field on a PEI according to the above proposal. In FIG. 13, it is assumed that $M_N=M_R=2$ and $N_N=N_R=4$.

In the above proposal, each parameter may be configured according to an independent configuration, but some parameters may also be determined by referencing other parameters depending on the configuration of the BS. For example, if parameters related to PO configurations of the Cap-N UE and Cap-L UE are all determined to be the same (e.g., paging cycle, number of POs per PF, number of PFs per default paging cycle, etc.), the value of $M_N$ may be reused as the value of $M_R$ with no separate configuration. In addition, if the BS does not separately configure the value of a PO per UE subgroup for the Cap-R UE, the value of $N_N$ may be reused as the value of $N_R$. Such parameter configuration methods may be advantageous in reducing the signaling overhead of the BS for PEI configurations.

According to the proposal, when a PO for the Cap-N UE (PO-N) and a PO for the Cap-R UE (PO-R) are distinguished from each other, a bitmap may be configured to provide UE group indication information by considering the PO-N and PO-R as independent POs. As a specific example, although a PO for the normal UE is configured in an initial BWP and a PO for the REDCAP UE is configured in a separate BWP, the proposed method may be applied when a PEI is transmitted on the same PEI-O in the same DCI.

Proposal 5 may be advantageous for PO and PEI configurations considering the characteristics of the UE because UE group/subgroup indications are distinguished and depending on the UE capability. Additionally, Proposal 5 the reduce signaling overhead due to PEI transmission by sharing the same PEI transmission.

Proposal 6: Structure in which Cap-N UE and Cap-R UE Share Bits of UE Group/Subgroup Indication Field For Proposal 5, PEI configuration information needs to be shared among UEs with different capabilities. This requires UE to acquire higher layer signaling that may not be relevant to its own capability. Additionally, the number of POs to be distinguished in a single PEI (i.e., the distinction of UE group indications) increases, which leads to an increase in the payload overhead of PEI DCI. Proposal 6 provides a structure where UEs with different capabilities are allowed to share bits of a UE group/subgroup indication field in PEI DCI. As a specific example, if the UE group/subgroup indication field in the PEI DCI used for the UE group/subgroup indication is configured in the form of a bitmap, the total size of the bitmap may be determined as shown in Equation 5.

$$B_T = M_T * N_T \quad \text{[Equation 5]}$$

In Equation 5, $M_T$ and $N_T$ denote the number of POs where one PEI is capable of providing wake-up information and the number of UE subgroups distinguishable per PO, respectively. The method of determining the values of $M_T$ and $N_T$ may vary depending on the configuration of the paging and PEIs of the Cap-N UE and Cap-L UE and parameters related thereto. Specific methods may follow Proposal 6-1 and Proposal 6-2 below.

Proposal 6-1: When PO Configurations of Cap-N UE and Cap-RUE are Same

Figure 14:
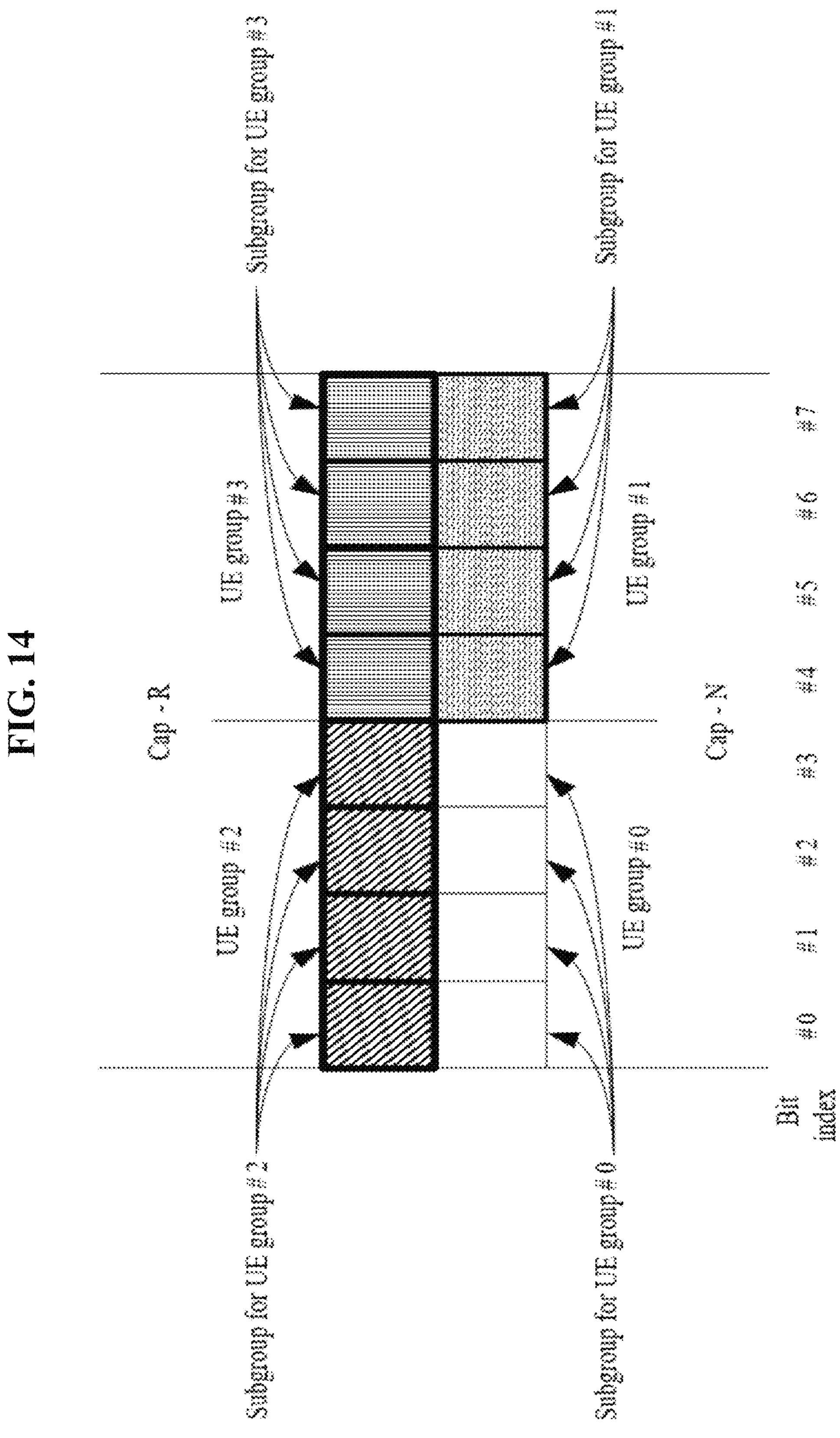

If the PO configurations for UEs with different capabilities are the same, the same PEI DCI field configuration may be expected. As a specific example, the number of POs indicated through one PEI may be applied equally to the Cap-N UE and Cap-R UE. This means that $M_T=M_N=M_R$ when $M_N$ refers to the number of POs of the Cap-N UEs corresponding to one PEI and $M_R$ refers to the number of POs of the Cap-R UEs corresponding to one PEI. In addition, to provide the size of an available UE subgroup indication to all capability UEs based on all the bits of the UE group/subgroup indication field, $N_T=N_N=N_R$ when $N_N$ refers to the number of UE subgroups per PO of the Cap-N UE and $N_R$ refers to the number of UE subgroups per PO of the Cap-R UE. FIG. 1 illustrates an example of the proposed method when $M_T=2$ and $N_T=4$. FIG. 14 shows a case where two POs for the Cap-N UE and two POs for the Cap-R UE correspond to one PEI, where each PO may provide four UE subgroup indications.

In the above proposal, the size of $N_T$ means the maximum number of bits available for a UE subgroup indication for each PO, and the number of bits used for an actual UE subgroup indication may vary for each PO (or for each capability). For example, the location of a bit that the UE expects to receive may be determined depending on the configuration of the BS (or upper node). The BS (or upper node) may have a relationship between bits and UE groups/subgroups within a limited bitmap area in consideration of the characteristics of the Cap-N UE and Cap-R UE.

The above proposal may be applied when paging and PEI-related parameters for the Cap-N UE and Cap-R UE are the same. Specifically, the same parameters may include paging-related parameters that determine the position of a PO in the time domain such as a paging cycle, the number of POs per PF, the number of PFs per default paging cycle, etc. Additionally, the number of POs for each capability corresponding to one PEI may be included. However, it may be permissible for the starting positions of a PO and PF (e.g., $PF_{offset}$ and/or a starting PDCCH monitoring occasion of a PO) or the frequency positions (e.g., BWP) thereof to have different values.

According to the above proposal, when the PO of the Cap-N UE (PO-N) and the PO of the Cap-R UE (PO-R) are different from each other, but when the configuration and related parameters of a PEI and paging are similar/shared, it is possible to support UEs with different capabilities through a single PEI while maintaining the size of the UE group/subgroup indication field. As a specific example, when PO configurations are shared/matched and PEI transmission is provided on the same PEI-O in the same DCI although the PO for the normal UE is configured in an initial BWP and the PO for the REDCAP UE is configured in a separate BWP, the above proposal may be applied.

Proposal 6-1 may be advantageous in terms of resource overhead and DCI payload because Proposal 6-1 is capable of providing indication information on POs distinguished for UEs with different capabilities with a single PEI while maintaining the size of the UE group/subgroup indication field. Additionally, since all (or most) of the paging and PEI related parameters may be shared, Proposal 6-1 may provide an advantageous effect in terms of saving higher layer signaling for configurations.

Proposal 6-2: When PO Configuration of Cap-N UE and PO Configuration of Cap-RUE are Different from Each Other Even if PO configurations for UEs with different capabilities are different, UE group/subgroup indication information may be transmitted through the same PEI to save overhead due to PEIs. In this case, the UEs with different capabilities may share bits of a UE group/subgroup indication field to prevent an increase in PEI DCI payload overhead. As a specific example, the number of POs indicated through one PEI may be allowed to be different for the Cap-N UE and Cap-R UE. This means that $M_N \neq M_R$ when $M_N$ refers to the number of POs of the Cap-N UEs corresponding to one PEI and $M_R$ refers to the number of POs of the Cap-R UEs corresponding to one PEI. In this case, the method of determining the values of $N_T$ of $M_T$ may be one of the following options.

$$M_T = M_N \ \& \ N_T = N_N \quad \text{(Option 6-2-1)}$$

A reference capability is determined, and the PO of a reference capability UE corresponds to the size of a PEI at all times. In this case, if capabilities are classified depending on whether the REDCAP is supported, the reference capability may be a normal NR UE that does not support REDCAP. This may prevent the functionality supported by a specific capability UE from being restricted by normal UEs. There may be benefits in terms of providing a structure where general UEs are capable of operating without acquiring higher layer signaling to support the specific capability UE. In this case, the value of $M_R$ is not influenced by the results of $M_T$. The value of $M_R$ may be selected based on the structure of the PEI and paging and parameters configured therefor.

When the above option is applied, the method for determining $N_T$ may also be based on the number of UE subgroups applicable to the reference capability for determining the value of $M_T$, resulting in $N_T = N_N$.

$$N_R = \min\{N_T * (M_T/M_R),\ N_{Max}\} \quad \text{[Equation 5]}$$

As one method, it may be determined that Equation 5 needs to be satisfied, where $N_{Max}$ denotes the maximum number of UE subgroups distinguishable per PO (or the number of bits capable of being used to distinguish UE subgroups). This may be to maximize the UE subgroup indication capability of the Cap-R UE within a limited bitmap size. As another method, if the conditions of $M_T$ and $M_R$ are met, it may be determined that the condition of $N_T = N_N = N_R$ is maintained. This may be to ensure the same UE subgrouping capability regardless of the UE capability classification by configuring the same available UE subgroup indication classification capability. As a further method, a method of allowing the BS to configure $N_R$ separately may be considered. In this case, Equation 5 above may be used to determine the upper limit of the number of UE subgroups configurable by the BS. This provides an advantageous effect of increasing the scheduling flexibility of the BS and upper node, instead of requiring an increase in signaling overhead.

$$B_T = \max(M_N * N_N,\ M_R * N_R) \quad \text{(Option 6-2-2)}$$

The size of the UE group/subgroup indication field may be set to the larger value of the total bitmap size required for different UE capabilities. In this case, if the value of $M_N * N_N$ is larger, the relationships of $M_T = M_N$ and $N_T = N_N$ are established, and conversely, if the value of $M_R * N_R$ is larger, the relationship of $M_T = M_R$ and $N_T = N_R$ are established. This may be advantageous in that the BS and/or upper node is allowed to freely control the size of the UE subgroup while ensuring the amount of information in the UE group/subgroup indication required for all capabilities. In this case, the values of $M_N$ and $M_R$ may be determined according to the paging and PEI structures configured by the BS and configured parameters.

When the above option is applied, the method of determining $N_N$ and $N_R$ may vary depending on the configuration of the BS. For example, when the BS indicates the number of common UE subgroups, the condition of $N_T = N_N = N_R$ is configured to be satisfied. Alternatively, a case where the BS configures the values of $N_N$ and $N_R$ respectively may be considered. In this case, each capability UE may have the advantage of not being limited in the number of UE subgroups by the paging/PEI configuration and configured parameters of other capability UEs.

FIG. 15 illustrates an example in which the proposed methods are applied. FIG. 15 shows bits composing a UE group/subgroup indication field when $M_N = 2$, $M_R = 1$, $N_N = 4$, and $N_R = 8$.

Figure 16:
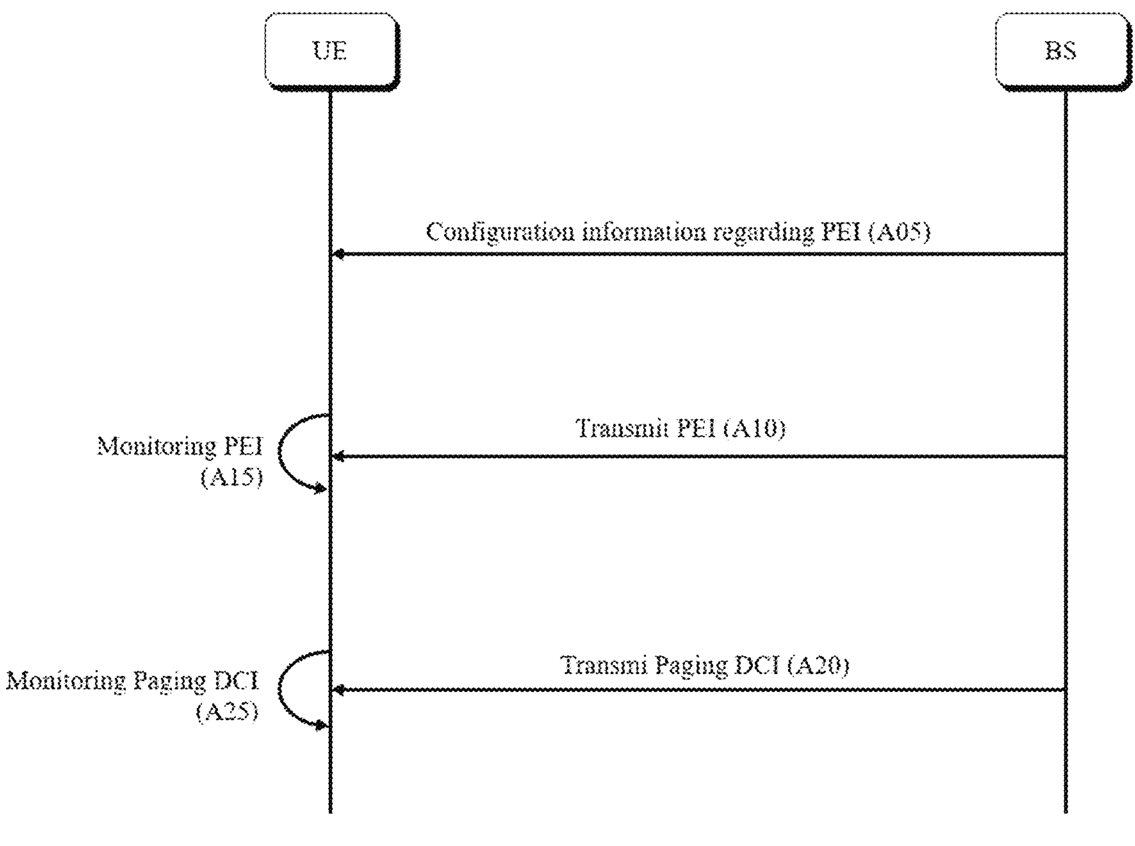
FIG. 16 illustrates a flow of a signal transmission/reception method according to an embodiment of the present disclosure.

FIG. 16 illustrates a flow of a signal transmission/reception method according to an embodiment of the present disclosure.

Referring to FIG. 16, the BS transmits configuration information regarding a PEI that early indicates whether monitoring of paging DCI on a PO is required (A05). The UE receives the configuration information regarding the PEI that early indicates whether the monitoring of the paging DCI on the PO is required.

The BS transmits the PEI to the UE based on the PEI configuration information (A10). The UE monitors the PEI based on the PEI configuration information (A15).

The BS may transmit the paging DCI on at least one PO associated with the PEI (A20). The UE may monitor the paging DCI on the at least one PO associated with the PEI based on detection of the PEI (A25).

Based on i) that the UE is a second type UE supporting a smaller maximum bandwidth than a first type UE and ii) that the configuration information regarding the PEI includes first configuration information which is common to the first type UE and the second type UE, the UE may determine a location of a PEI-monitoring occasion (PEI-MO) for monitoring the PEI. In determining the location of the PEI-MO, the UE may identify a location of a first PO for the first type UE based on a second PO for the second type UE and determine the location of the PEI-MO by applying a first offset value obtained from the first configuration information to the identified location of the first PO.

The UE may determine a PO for the first type UE closest to the second PO among POs for the first type UE as the first PO.

The UE may determine a PO for the first type UE closest to the second PO among POs for the first type UE preceding the second PO as the first PO.

The UE may identify the first PO by applying a second offset value to the second PO. The configuration information regarding the PEI may further include second configuration information dedicated to the second type UE, and the UE may obtain the second offset value from the second configuration information.

The PEI may be a PEI common to the first type UE and the second type UE. The at least one PO associated with the PEI may include the first PO for the first type UE and the second PO for the second type UE. The UE may monitor the paging DCI on the second PO rather than the first PO.

The PEI may include a bitmap shared between the first type UE and the second type UE. The UE associates each bit of the bitmap with each subgroup based on a number of second type UE groups and a number of subgroups per each second type UE group.

Figure 17:
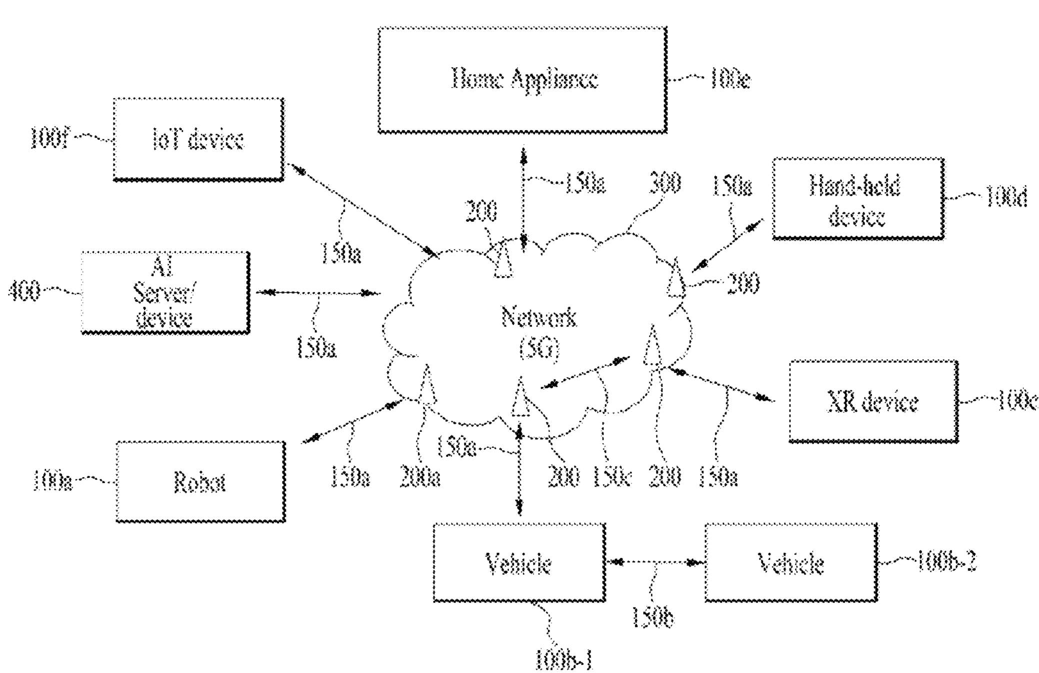
FIGS. 17 to 20 illustrate an example of a communication system 1 and wireless devices applicable to the present disclosure.

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
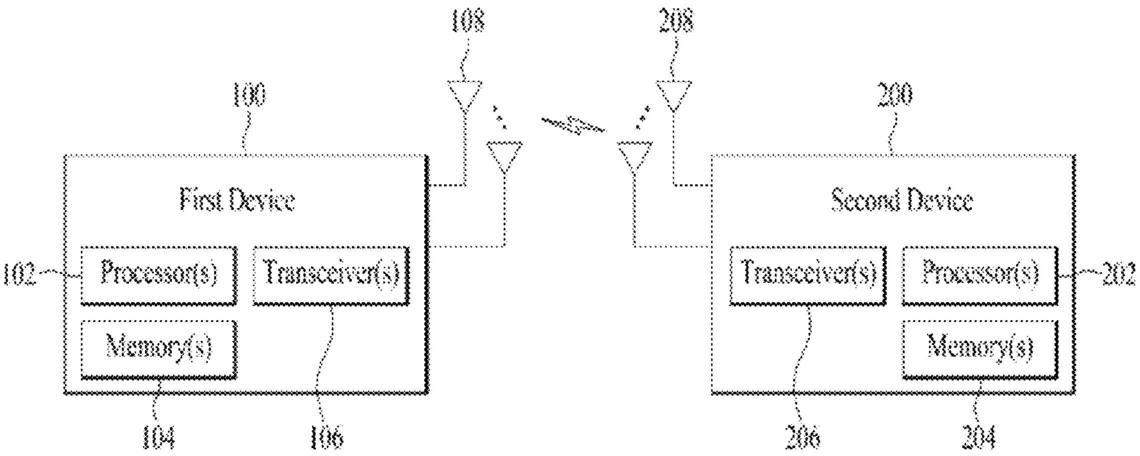

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In an embodiment of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In an embodiment of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
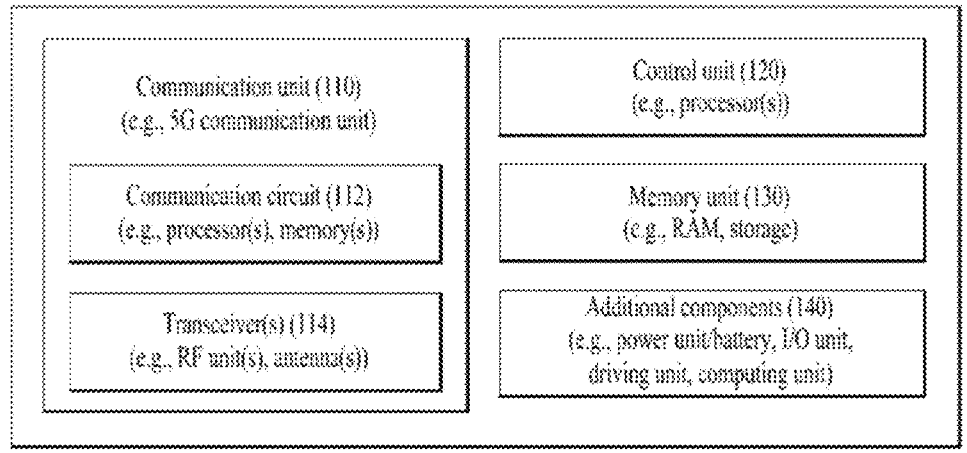

FIG. 19 illustrates another example of a wireless device applied to the present disclosure. The wireless device may be implemented in various forms according to a use-case/service (refer to FIG. 17).

Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 20:
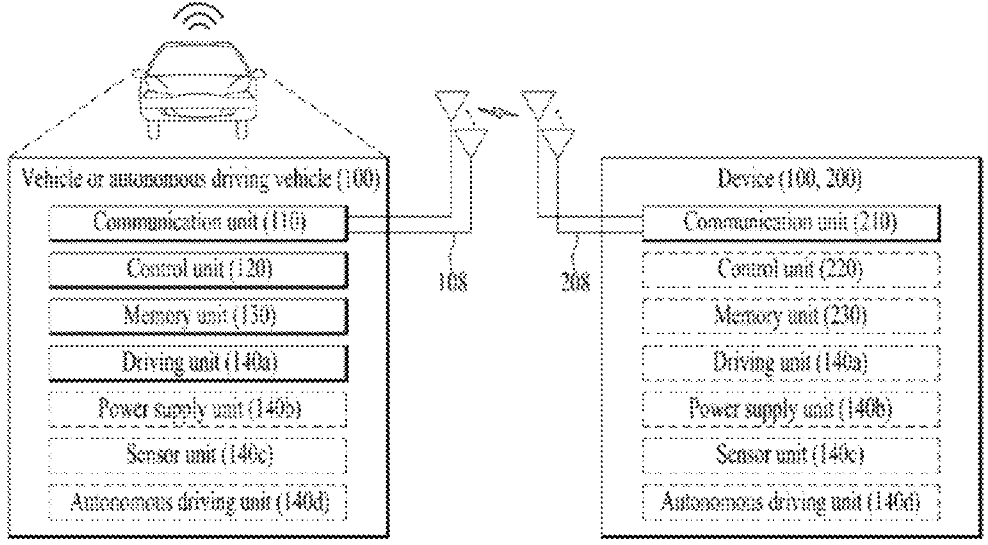

FIG. 20 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 20, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 21:
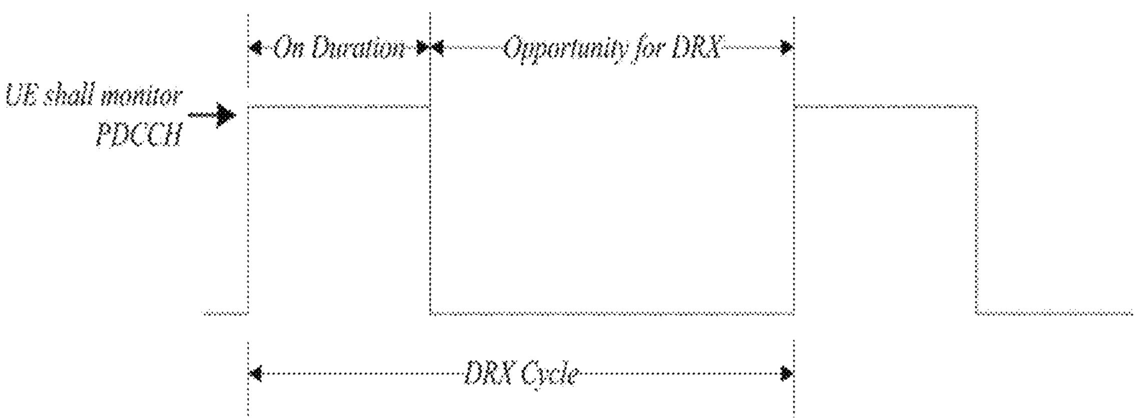
FIG. 21 illustrates an exemplary discontinuous reception (DRX) operation applicable to the present disclosure.

FIG. 21 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 21, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in an embodiment of the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in an embodiment of the present disclosure. Irrespective of whether DRX is configured, PDCCH monitoring may be restricted during a time period configured as a measurement gap.

Table 6 describes a DRX operation of a UE (in the RRC_CONNECTED state). Referring to Table 6, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 6

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

- Value of drx-OnDurationTimer: defines the duration of the starting period of the DRX cycle.
- Value of drx-InactivityTimer: defines the duration of a time period during which the UE is awake after a PDCCH occasion in which a PDCCH indicating initial UL or DL data has been detected
- Value of drx-HARQ-RTT-TimerDL: defines the duration of a maximum time period until a DL retransmission is received after reception of a DL initial transmission.
- Value of drx-HARQ-RTT-TimerDL: defines the duration of a maximum time period until a grant for a UL retransmission is received after reception of a grant for a UL initial transmission.
- drx-LongCycleStartOffset: defines the duration and starting time of a DRX cycle.
- drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, an embodiment may be configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

What is claimed is:

1. A method of receiving a signal by a user equipment (UE) in a wireless communication system, the method comprising:

receiving configuration information regarding a paging early indication (PEI) for early indicating whether monitoring of paging downlink control information (DCI) on a paging occasion (PO) is required;

monitoring the PEI based on the configuration information regarding the PEI; and monitoring the paging DCI on at least one PO associated with the PEI based on detection of the PEI, wherein based on i) that the UE is a second type UE supporting a smaller maximum bandwidth than a first type UE and ii) that the configuration information regarding the PEI includes first configuration information which is common to the first type UE and the second type UE, the UE determines a location of a PEI-monitoring occasion (PEI-MO) for monitoring the PEI, and wherein in determining the location of the PEI-MO, the UE:

identifies a location of a first PO for the first type UE based on a second PO for the second type UE; and determines the location of the PEI-MO by applying a first offset value obtained from the first configuration information to the identified location of the first PO.

2. The method of claim 1, wherein the UE determines a PO for the first type UE closest to the second PO among POs for the first type UE as the first PO.

3. The method of claim 1, wherein the UE determines a PO for the first type UE closest to the second PO among POs for the first type UE preceding the second PO as the first PO.

4. The method of claim 1, wherein the UE identifies the first PO by applying a second offset value to the second PO.

5. The method of claim 4, wherein the configuration information regarding the PEI further includes second configuration information dedicated to the second type UE, and wherein the UE obtains the second offset value from the second configuration information.

6. The method of claim 1, wherein the PEI is a PEI common to the first type UE and the second type UE, and wherein the at least one PO associated with the PEI includes the first PO for the first type UE and the second PO for the second type UE.

7. The method of claim 6, wherein the UE monitors the paging DCI on the second PO rather than the first PO.

8. The method of claim 1, wherein the PEI includes a bitmap shared between the first type UE and the second type UE, and wherein the UE associates each bit of the bitmap with each subgroup based on a number of second type UE groups and a number of subgroups per each second type UE group.

9. A non-transitory computer-readable recording medium having recorded thereon a program for executing the method of claim 1.

10. A device for wireless communication, the device comprising:

a memory configured to store instructions; and a processor configured to perform operations by executing the instructions, wherein the operations of the processor comprise:

receiving configuration information regarding a paging early indication (PEI) for early indicating whether monitoring of paging downlink control information (DCI) on a paging occasion (PO) is required;

monitoring the PEI based on the configuration information regarding the PEI; and monitoring the paging DCI on at least one PO associated with the PEI based on detection of the PEI, wherein based on i) that the device is a second type device supporting a smaller maximum bandwidth than a first type device and ii) that the configuration information regarding the PEI includes first configuration information common to the first type device and the second type device, the processor is configured to determine a location of a PEI-monitoring occasion (PEI-MO) for monitoring the PEI, and wherein in determining the location of the PEI-MO, the processor is configured to:

identify a location of a first PO for the first type device based on a second PO for the second type device; and determine the location of the PEI-MO by applying a first offset value obtained from the first configuration information to the identified location of the first PO.

11. The device of claim 10, further comprising:

a transceiver configured to transmit or receive a radio signal under control of the processor.

12. The device of claim 10, wherein the device is a user equipment (UE) configured to operate in a wireless communication system.

13. The device of claim 10, wherein the device is an application-specific integrated circuit (ASIC) or digital signal processing device configured to control a user equipment (UE) operating in a wireless communication system.

14. A method of transmitting a signal by a base station (BS) in a wireless communication system, the method comprising:

transmitting configuration information regarding a paging early indication (PEI) for early indicating whether monitoring of paging downlink control information (DCI) on a paging occasion (PO) is required;

transmitting the PEI to a user equipment (UE) based on the configuration information regarding the PEI; and transmitting the paging DCI on at least one PO associated with the PEI, wherein based on i) that the UE is a second type UE supporting a smaller maximum bandwidth than a first type UE and ii) that the configuration information regarding the PEI includes first configuration information which is common to the first type UE and the second type UE, the BS determines a location of a PEI-monitoring occasion (PEI-MO) for transmitting the PEI, and wherein the determined location of the PEI-MO is obtained by applying a first offset value indicated by the first configuration information to a location of a first PO for the first type UE identified based on a second PO for the second type UE.

15. A base station (BS) for wireless communication system, the BS comprising:

a memory storing instructions; and a processor configured to perform operations by executing the instructions, wherein the operations of the processor comprise:

transmitting configuration information regarding a paging early indication (PEI) for early indicating whether monitoring of paging downlink control information (DCI) on a paging occasion (PO) is required;

transmitting the PEI to a user equipment (UE) based on the configuration information regarding the PEI; and transmitting the paging DCI on at least one PO associated with the PEI, wherein based on i) that the UE is a second type UE supporting a smaller maximum bandwidth than a first type UE and ii) that the configuration information regarding the PEI includes first configuration information which is common to the first type UE and the second type UE, the processor is configured to determine a location of a PEI-monitoring occasion (PEI-MO) for transmitting the PEI, and wherein the determined location of the PEI-MO is obtained by applying a first offset value indicated by the first configuration information to a location of a first PO for the first type UE identified based on a second PO for the second type UE.

* * * * *